G. O. DEGENER.
COMBINED TYPEWRITING AND COMPUTING MACHINE.
APPLICATION FILED NOV. 12, 1917.
1,347,621.
Patented July 27, 1920.
14 SHEETS—SHEET 1.
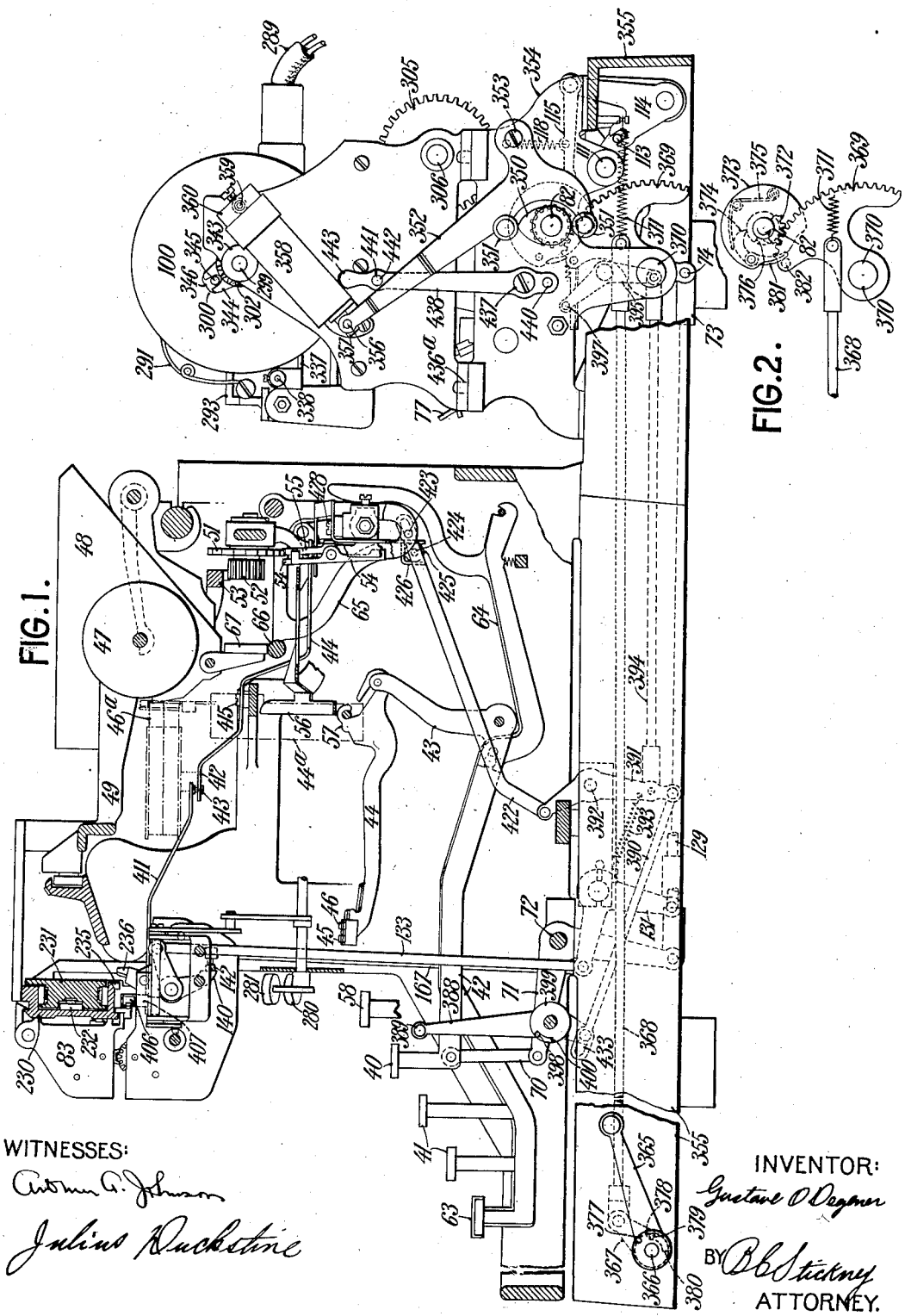

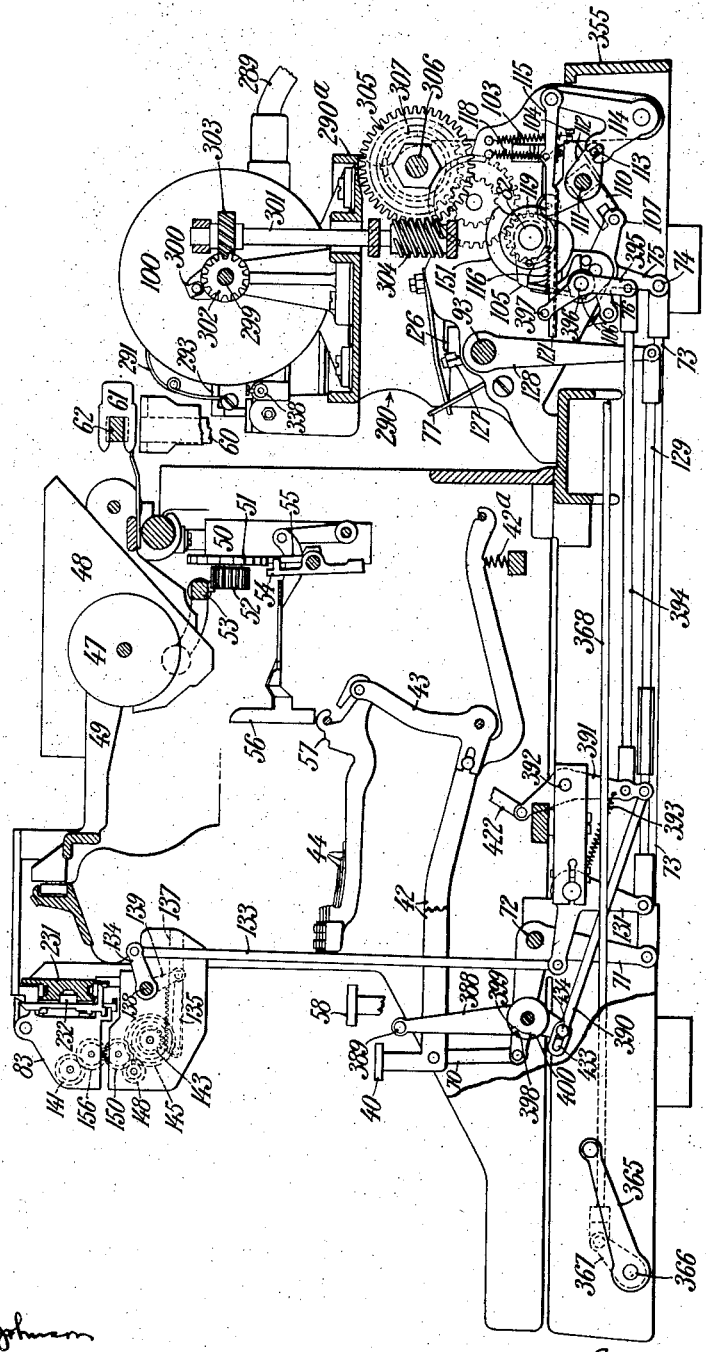

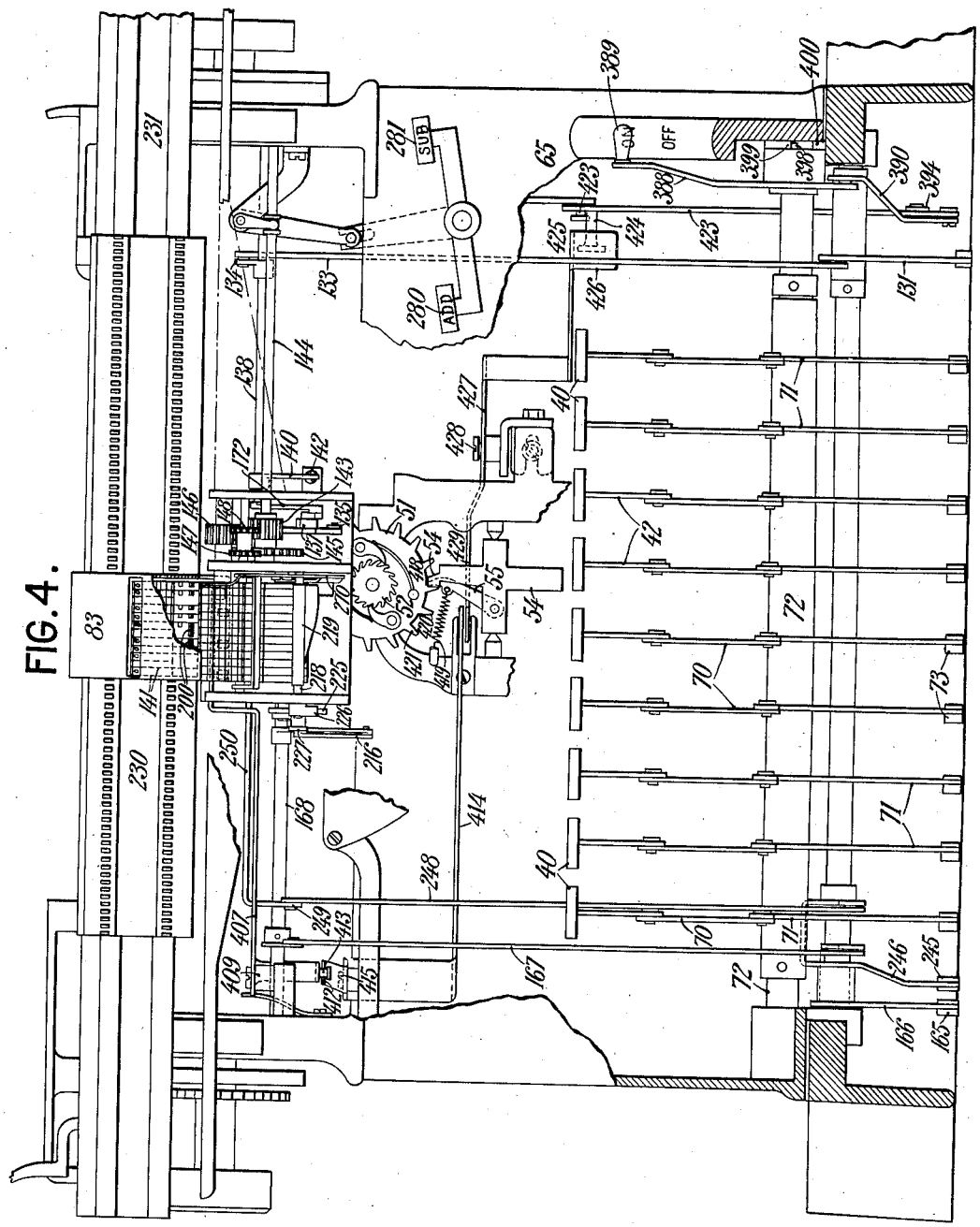

G. O. DEGENER.
COMBINED TYPEWRITING AND COMPUTING MACHINE.
APPLICATION FILED NOV. 12, 1917.
1,347,621.
Patented July 27, 1920.
14 SHEETS—SHEET 4.
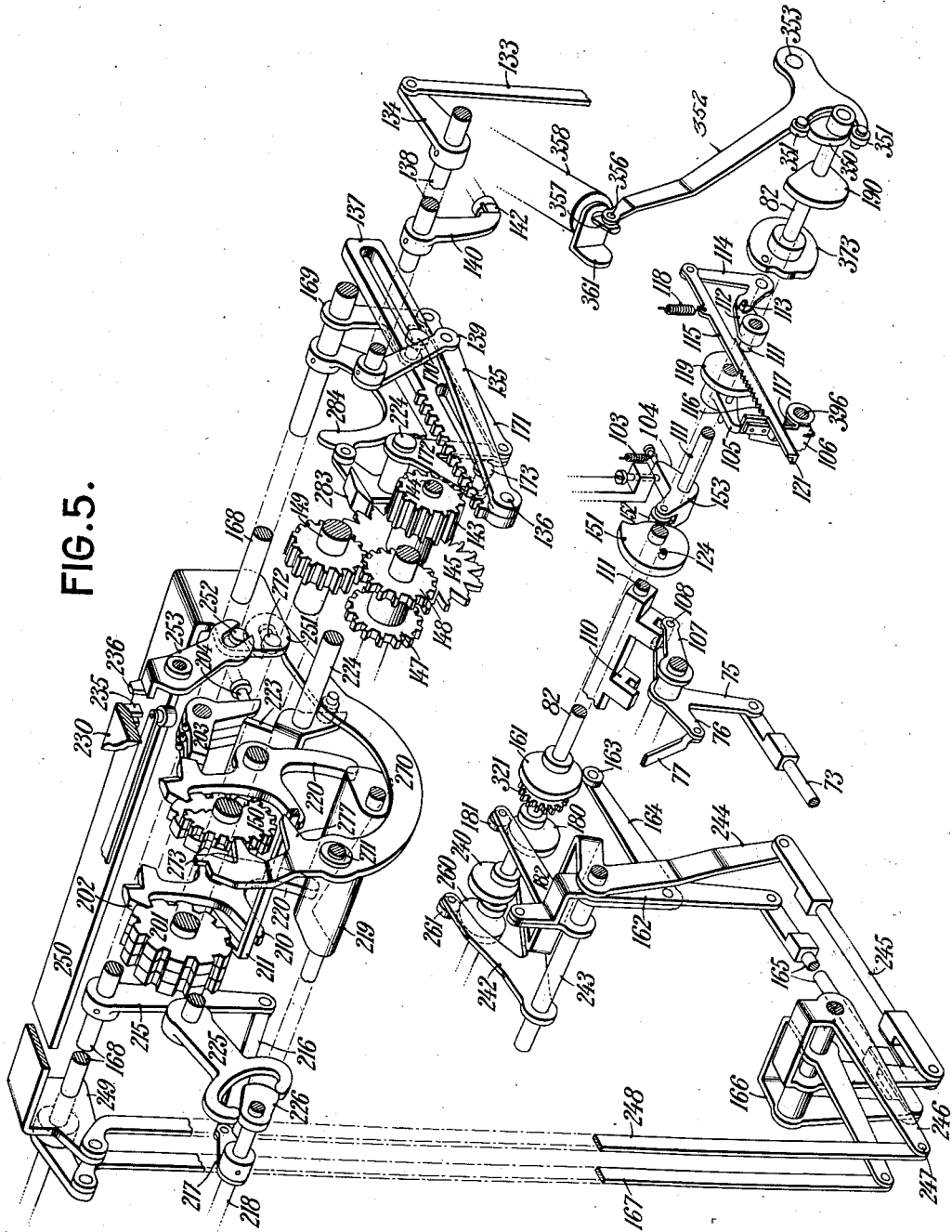

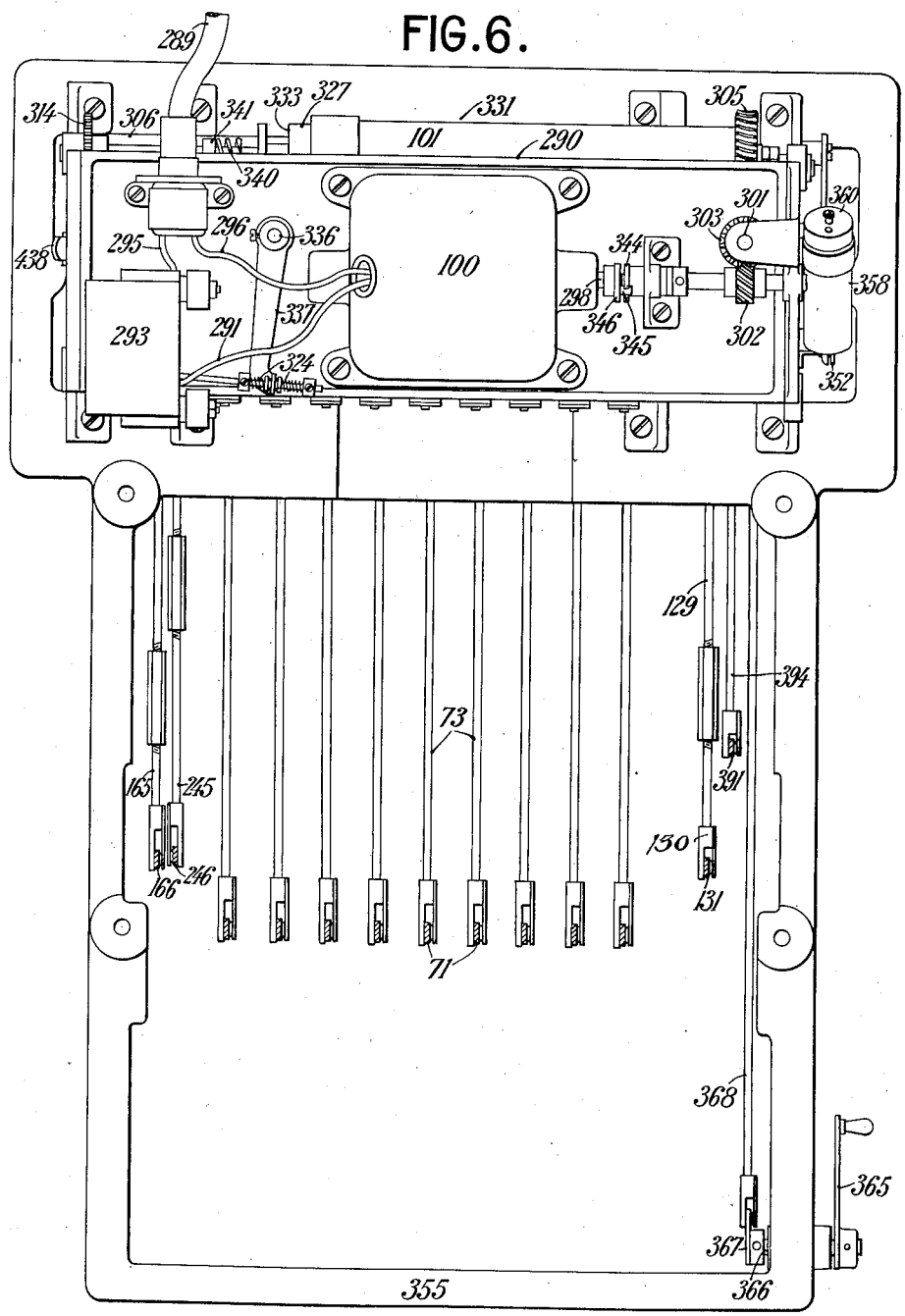

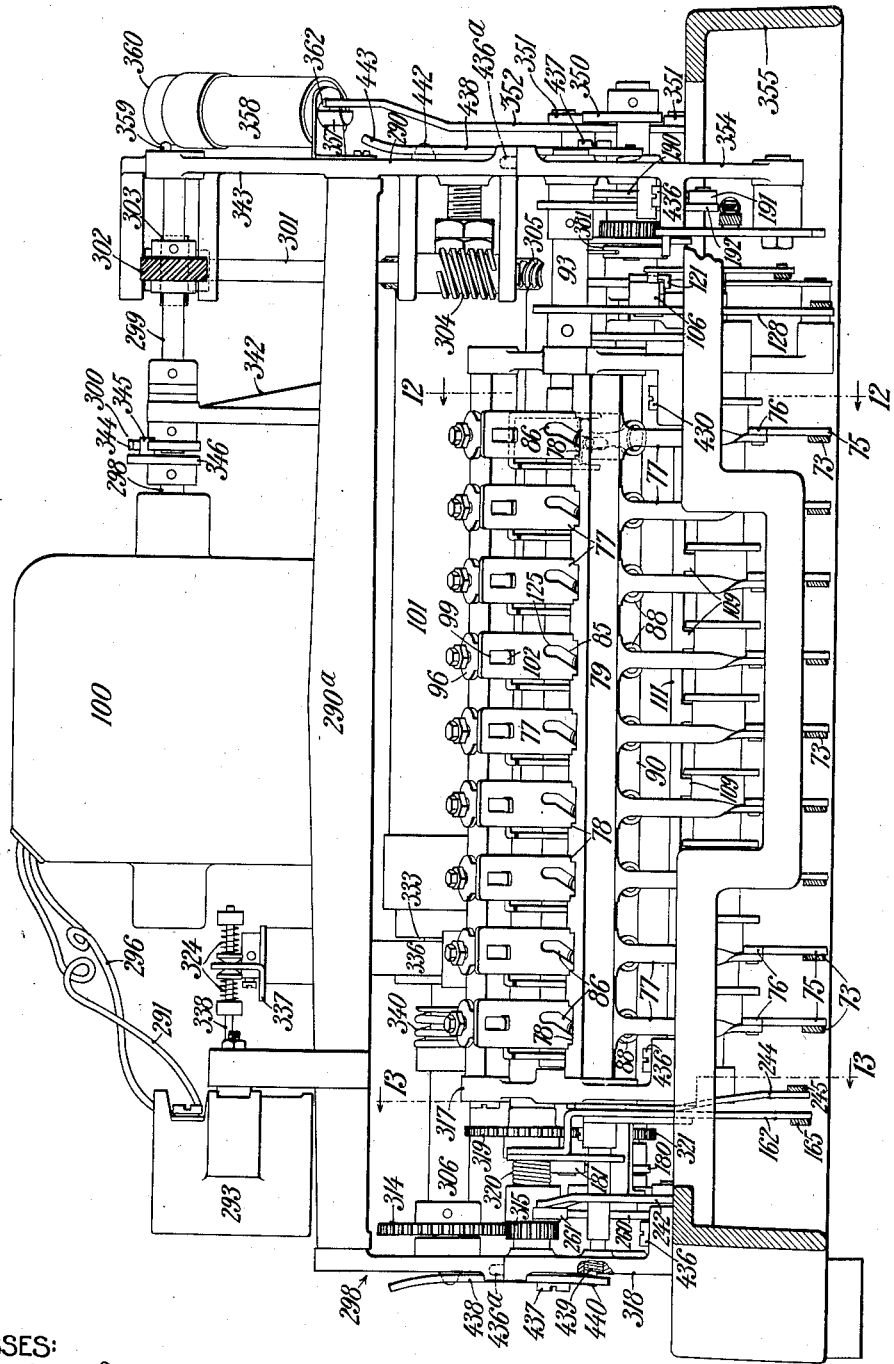

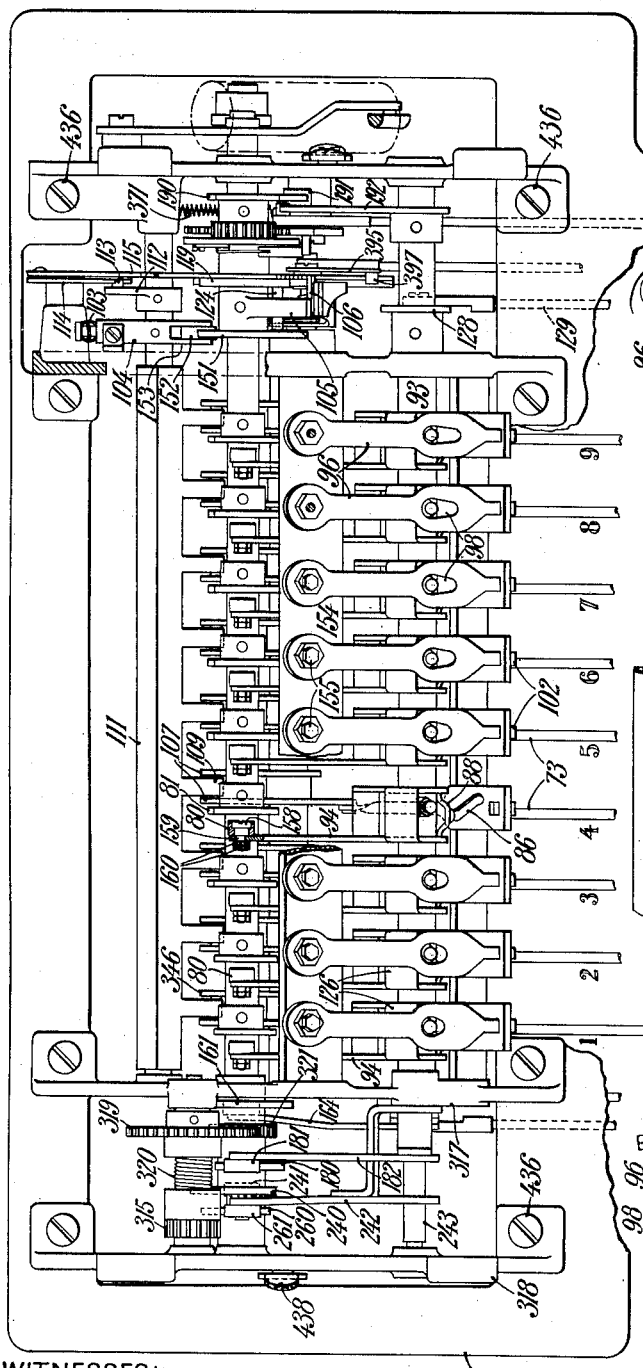

G. O. DEGENER.
COMBINED TYPEWRITING AND COMPUTING MACHINE.
APPLICATION FILED NOV. 12, 1917.

1,347,621.

Patented July 27, 1920.
14 SHEETS—SHEET 8.

WITNESSES:

INVENTOR:
Gustave O Degener
BY
Attorney.

G. O. DEGENER.
COMBINED TYPEWRITING AND COMPUTING MACHINE.
APPLICATION FILED NOV. 12, 1917.

1,347,621.

Patented July 27, 1920.
14 SHEETS—SHEET 9.

WITNESSES:

INVENTOR:
Gustave O. Degener
BY B. C. Stickney
ATTORNEY.

G. O. DEGENER.
COMBINED TYPEWRITING AND COMPUTING MACHINE.
APPLICATION FILED NOV. 12, 1917.
1,347,621.
Patented July 27, 1920.
14 SHEETS—SHEET 10.
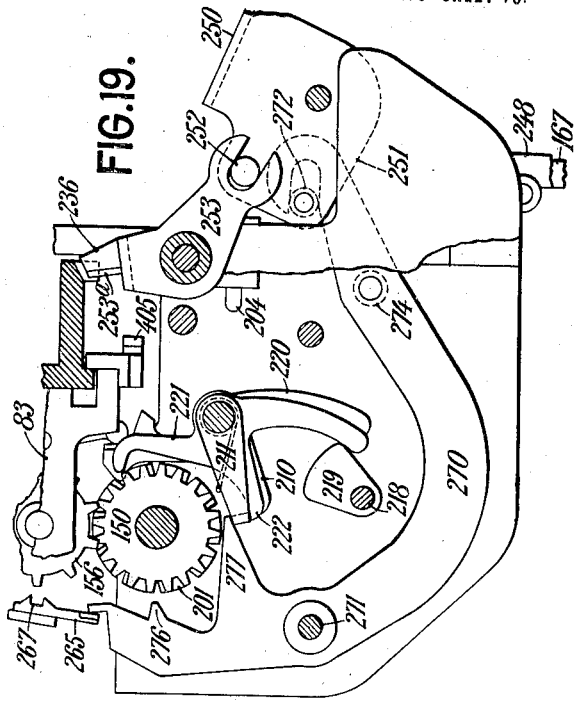
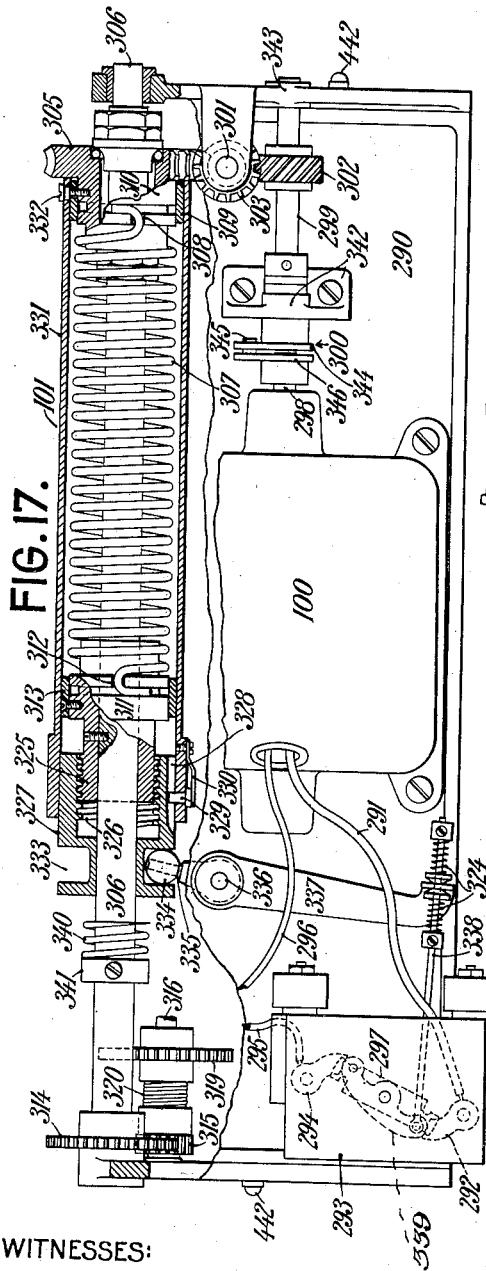
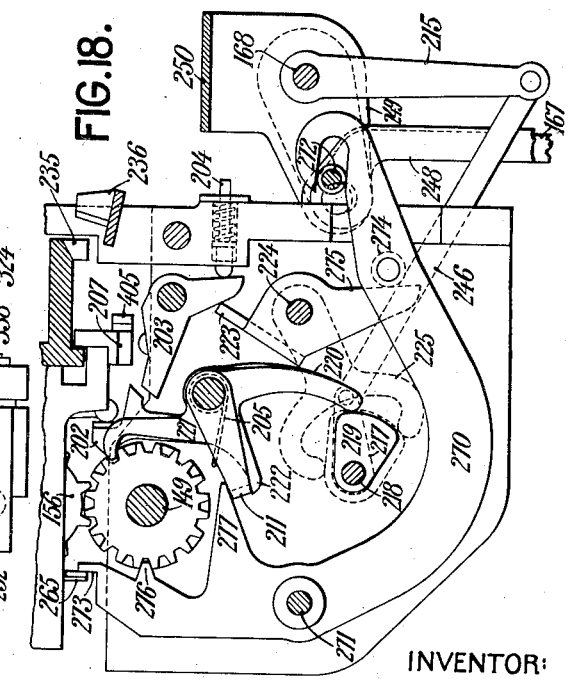
WITNESSES:
INVENTOR:
Gustave O Degener
BY
B C Stickney
ATTORNEY.

G. O. DEGENER.
COMBINED TYPEWRITING AND COMPUTING MACHINE.
APPLICATION FILED NOV. 12, 1917.

1,347,621.

Patented July 27, 1920.
14 SHEETS—SHEET 11.

WITNESSES:

INVENTOR:
Gustave O Degener
BY
ATTORNEY.

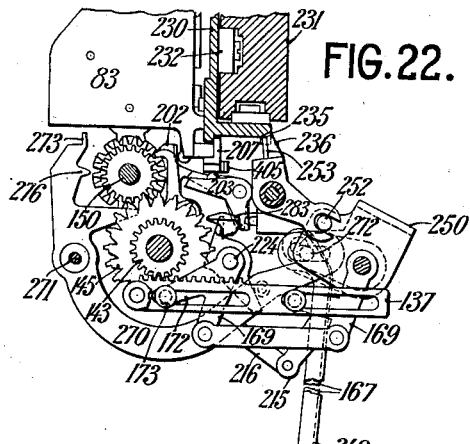
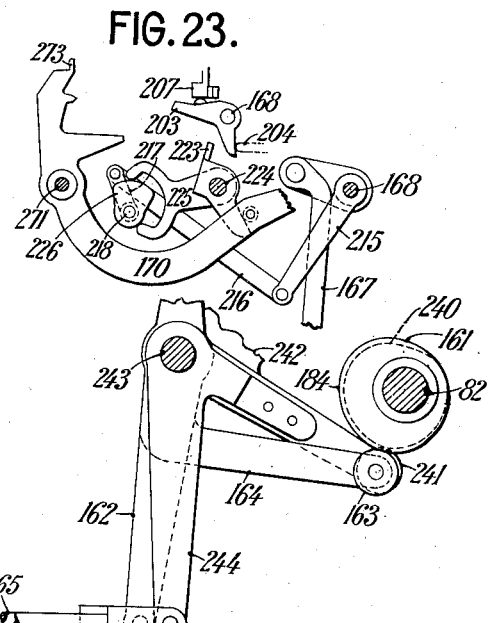
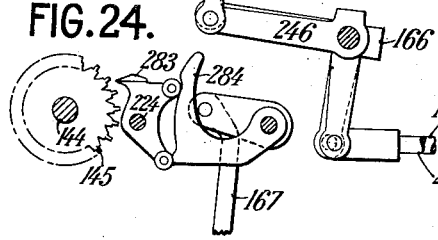
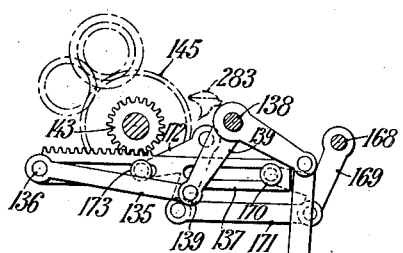
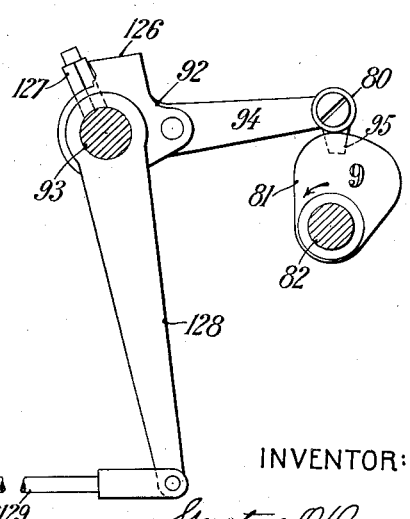

G. O. DEGENER.
COMBINED TYPEWRITING AND COMPUTING MACHINE.
APPLICATION FILED NOV. 12, 1917.
1,347,621.
Patented July 27, 1920.
14 SHEETS—SHEET 13.
FIG.26.
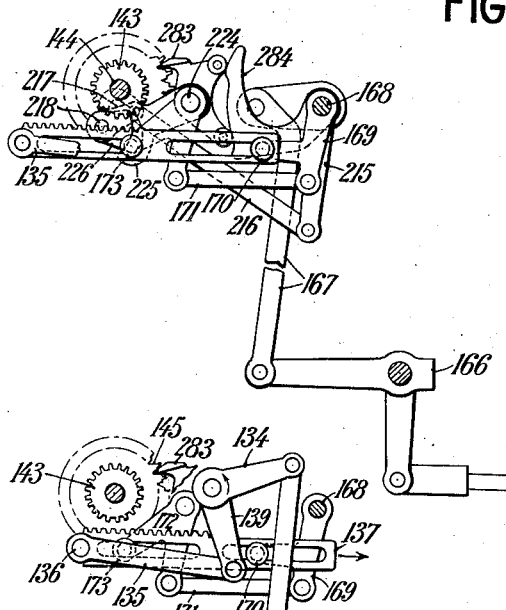
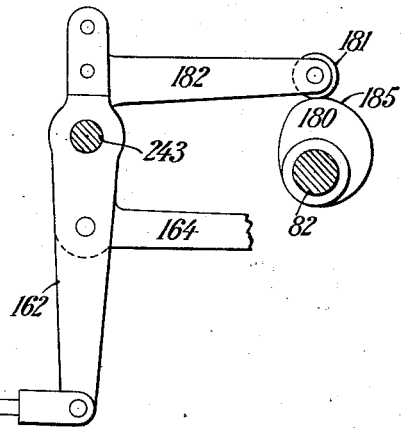
FIG.27.
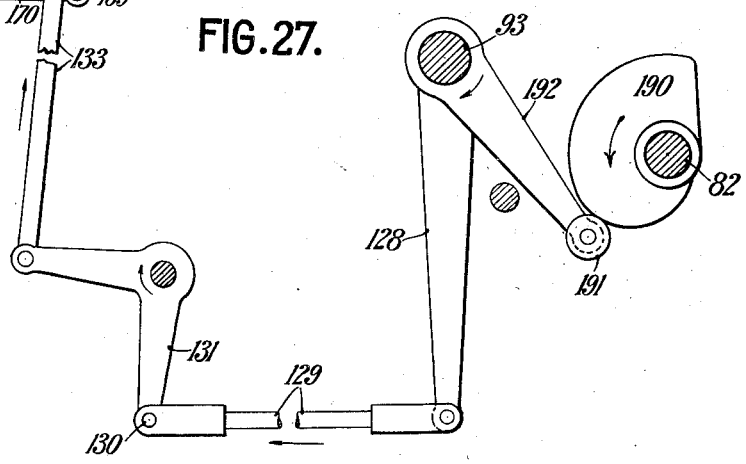
WITNESSES:
INVENTOR:
Gustave O Degener
BY
ATTORNEY.

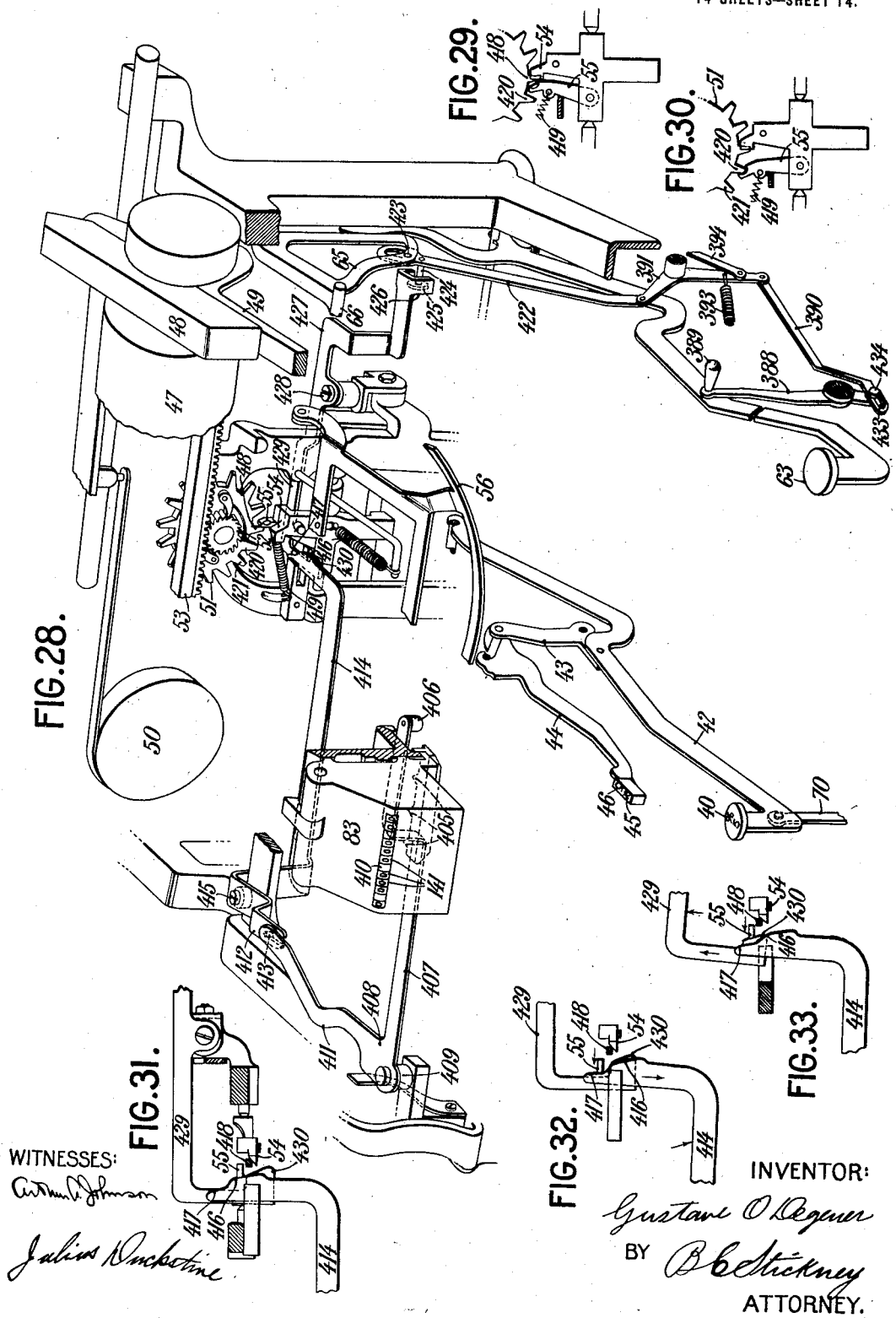

UNITED STATES PATENT OFFICE.

GUSTAVE O. DEGENER, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,347,621.   Specification of Letters Patent.   Patented July 27, 1920.

Application filed November 12, 1917. Serial No. 201,626.

*To all whom it may concern:*

Be it known that I, GUSTAVE O. DEGENER, a citizen of the United States, residing in Brooklyn borough, in the county of Kings, city and State of New York, have invented certain new and useful Improvements in Combined Typewriting and Computing Machines, of which the following is a specification.

My invention relates to computing machines, and is herein illustrated as applied to a combined typewriting and computing machine of the Addendagraph type, and as in the form of an improvement on the applications of Henry L. Pitman, Serial No. 24,390, filed April 28, 1915 (now Patent No. 1,308,506, dated July 1, 1919); and Frederick A. Hart, Serial No. 70,898, filed January 8, 1916 (now Patent No. 1,285,150, dated November 19, 1918). In this type of machine the numeral keys of the typewriter control a master actuator, by means of which the digits of the numbers to be computed are run one at a time into a traveling totalizer.

The typewriter herein illustrated is of the Underwood type and is equipped with the usual appurtenances, including a traveling carriage, an escapement mechanism whereby the carriage may be caused to move step by step in letter feeding direction, and case-shift mechanism.

The computing mechanism is of the master wheel type, and is provided with a train of gearing for directly driving the master wheel from the master actuator for the performance of addition or subtraction, said gearing being so arranged that it may be disconnected from a driving mechanism in case it is desired not to compute.

The train of gearing may be actuated by the master actuator in the form of a rack bar, which in its normal position is out of engagement with the driving train, and is so connected to the numeral keys as to be brought into engagement with the master wheel gearing during the initial part of the actuation of any numeral key, and is then driven to actuate the gearing and totalizer dials an extent directly proportional to the value of the actuated numeral key, after which it is moved out of engagement with the gearing and returned idly relatively to said train of gearing, to its normal position, and is positively controlled in these movements by power driven cams, which also serve to positively hold said rack bar against accidental displacement during its actuation, and when at rest. This rack bar may be driven from the numeral keys through the intermediary of an indexing mechanism, including interponents, which may be positively moved laterally and held in juxtaposition with a series of differential or valuating cams, one for each numeral key from "1" to "9," and arranged to actuate an oscillator, including a shaft, on which said interponents are mounted and to which the rack-bar is connected to be positively driven back and forth by the driving mechanism of the machine, and positively limited in its forward stroke by overthrow preventing means included in the indexing mechanism and coöperating with the oscillator.

I have found it advantageous to provide a power drive for the computing mechanism, which may include an electric motor, connected by suitable gearing to a spring motor, which in turn is connected to drive the differential or valuating cams through gearing, and is arranged to actuate an electric switch to control the electric motor to store energy in the spring motor when the latter becomes nearly exhausted by driving the computing mechanism, and to stop the electric motor when sufficient energy has been stored in the spring motor. The spring motor enables the machine to be operated more rapidly and also enables the numeral keys to be depressed more rapidly and more easily, said keys being connected to the driving mechanism, so that the latter will aid in the actuation of said keys, the latter being arranged to be connected to the driving mechanism prior to its release. The numeral keys may also be actuated when the motor is silenced. The parts of the spring motor are formed and arranged so as to permit ease of manufacture, adjustment and repair, and the motor connection is provided with means for preventing undue strain and consequent wreckage of the parts. The electric switch is controlled by the spring motor and includes in its connections thereto means for preventing overthrow of the switch parts and for preventing wreckage.

As herein illustrated, when one of said index interponents is partially moved by a type key in an indexing operation, the motor will complete said indexing operation prior to the effective actuation of the valuating cams, thereby reducing the load on the numeral keys.

The device may also include means for locking the totalizer and typewriter carriage against moving in letter feeding direction, when the master wheel or any of the tens-carrying wheels are being actuated or come to a stop in a fractional digit position or an intermediate position.

This device is herein shown as part of a mechanism, whereby the typewriter carriage and totalizer thereon may be locked by power driven cams against letter feeding motion to positively hold the totalizer in proper relation with the master wheel and tens-carrying wheels during a computing action, and to reduce the load on the numeral keys.

This mechanism may be connected to a mechanism, whereby the master wheel and tens-carrying wheels may be alined by the power of the motor at the end of a computation in case the teeth of said wheels should at this time assume a spiral arrangement or another abnormal position.

These parts may coöperate with pawls for alining the tens-carrying wheels so that they normally lock said wheels against displacement and are released only during a computing action. To protect the mechanism and to enable it to operate at a higher speed at intermediate points the force with which the parts of the computing mechanism are moved at the end of a computation may be reduced by mechanism interposed in the gearing of the driving mechanism, and also by supplemental mechanism acting to check the speed of the motor as it approaches the end of its stroke in a computation.

To enable the untying of the mechanism, which sometimes may be required if it is attempted to operate parts wrongly, there may be provided devices whereby the parts of the computing mechanism and typewriting mechanism may be returned to their normal positions at the actuation of a handle, provided for the purpose, within easy reach of the operative.

Between millions and hundred-thousands denominations, thousands and hundreds denominations, and between units dollars and tens of cents denominations, and between similar denominations, it is often customary to "point off", and blank spaces therefor are often provided on the totalizer. Cams on the totalizer may be effective to control the feeding of the typewriter carriage to effect this pointing off, one cam for each blank space thereon. These cams may actuate a series of bell cranks, the arms of which extend along the front of the machine from about the center toward the left side of the typewriter frame, and there meet connections extending rearwardly and along the rear of the typewriter frame from left to right to the escapement mechanism, to control the latter. This space-skipping mechanism is supplemented by devices for rendering it ineffective when it is desired not to compute, which are for this purpose connected to a handle at the front of the machine, which when actuated silences the space skipping mechanism and also the computing mechanism. The case-shift frame of the typewriter is advantageously connected to actuate the mechanism controlled by said handle so that when writing in upper case, the computing mechanism and space skipping mechanism are silenced. This arrangement of mechanism affords ease of construction, adjustment and repairs, and reduces the cost of manufacture.

I have found it advantageous to construct the machine so that portions thereof may be removed for repairs, adjustment or substitution, without disturbing the other portions thereof in their adjustment. With this in view, I have provided in the structure shown a common base plate, at the forward end of which is mounted the typewriter framework, and at the rear end of which is mounted a framework which supports the indexing mechanism and differential cams. On this second framework is mounted another framework which supports the electric motor and spring motor and also the gearing therebetween, the electric switch and the dash pot for checking the speed of the spring motor. This latter framework is very easily removed from the first framework; there being provided appurtenances for the purpose. The typewriter and framework at the rear of the base plate may easily be lifted off the latter after the removal of a few screws.

Other features and advantages will hereinafter appear.

In the accompanying drawings,

Figure 1 is a sectional side elevation of the machine, showing the parts in normal adding position.

Fig. 2 is a fragmentary detail view of some of the parts shown in Fig. 1, for restoring the mechanism to normal position, after a malaction.

Fig. 3 is a sectional side elevation of the machine, with parts omitted for clearness, showing mechanism not illustrated in Fig. 1.

Fig. 4 is a sectional front elevation of the machine, with parts omitted for clearness.

Fig. 5 is a skeleton perspective view of some of the computing mechanism and the power drive associated therewith.

Fig. 6 is a top plan view of the machine, with the typewriter removed, showing the driving mechanism and connections from the numeral keys to the indexing mechanism.

Fig. 7 is a fractional front elevation, showing the driving mechanism and the indexing mechanism.

Fig. 8 is a top plan view of the indexing mechanism, shown in Fig. 7, with the bridge supporting the primary and secondary motors removed, and parts broken away to show the underlying structure.

Fig. 9 is a detail view in section, showing the indexing element associated with the "4" numeral key.

Fig. 10 is a plan view of a portion of Fig. 8, showing the parts associated with the "4" numeral key in actuated position.

Fig. 11 is a diagrammatic skeleton perspective view of the parts of the indexing mechanism associated with the "8" numeral key.

Fig. 17 is a top plan view of the bridge supporting the driving mechanism, with parts broken away for clearness.

Fig. 18 is an enlarged detail view, showing the parts associated with the master wheel and carry-over wheels in their normal positions.

Fig. 19 is a view similar to Fig. 18, but showing the master wheel out of its proper position of rest and how its pawl is effective through a universal bar coöperating with a suitable train of mechanism to render the truck lock effective, so as to prevent a movement of the carriage at this time.

Figure 13:
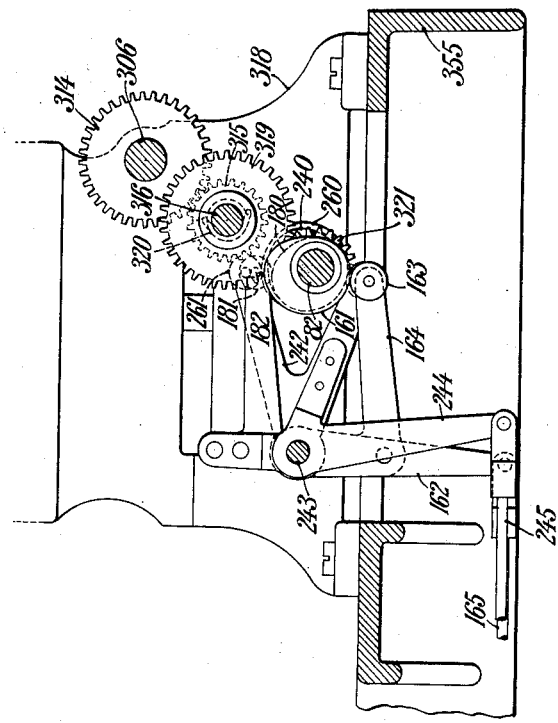
Fig. 13 is a sectional side elevation, taken on the line 13—13 of Fig. 7, showing a portion of the driving mechanism and a portion of the mechanism for moving the driving rack to and away from its effective position.

Fig. 22 is a side view of the master wheel and some associated parts, and connections to the driving mechanism, and shows the effect of the power shaft to raise the driving rack to its effective position, also the truck lock rendered effective. This view also shows the universal bar-controlling spring-pressed pawls for the alining pawls moved to effective position, so that the alining pawls will be rendered effective.

Fig. 23 is a detail view, showing the cam associated with a forked arm for raising the driving rack to its effective position, the position of the parts corresponding to that of Fig. 22.

Fig. 24 is a detail view, showing the alining or holding pawl released from its associated gear wheel, the position of the parts corresponding to that of Fig. 22.

Fig. 25 is a side view, showing that stage of the movement of the power shaft when it has been effective to move the master wheel driving rack to its extreme forward position, by means of the valuating cam and the indexing mechanism associated with the "9" numeral key.

Fig. 26 is a side view, showing that stage of the movement of the power shaft when it has been effective to disengage the driving rack after transmitting movement to the master wheel.

Fig. 27 is a side view, showing the master wheel driving rack being returned to its normal position by the driving mechanism.

Fig. 28 is a skeleton perspective view, showing the mechanism for causing the typewriter carriage to move two letter spaces at the single actuation of a type key, and connections with the case-shift mechanism and the control lever for the computing mechanism.

Fig. 29 is a front view in detail of the escapement mechanism, showing the upper part of the dog rocker moved rearwardly from the Fig. 4 position, and the loose dog swung to a position to effect single-space movements of the typewriter carriage.

Fig. 30 is a view similar to Fig. 29, showing the parts actuated for a double letter-space movement.

Fig. 31 is a detail plan view of the escapement dogs and adjacent parts, showing the parts actuated for single letter-spacing and corresponding to the Fig. 29 position.

Fig. 32 is a view similar to Fig. 31, showing the parts actuated for double letter-spacing and corresponding to the Fig. 30 position.

Fig. 33 is a view similar to Fig. 32, showing the stop-carrying lever set for double letter-spacing, and a second stop lever under the control of the case-shift mechanism and the non-compute key, which has been rendered effective to cause the letter-space movements to be single spaced.

Numeral keys 40 and character keys 41 depress key levers 42 against the tension of springs 42$^a$ to rock bell-cranks 43, to swing type-bars 44, mounted in a type-bar segment 44$^a$ upwardly and rearwardly, to cause types 45, 46 thereon to print through a ribbon 46$^a$ and against the front side of a cylindrical platen 47, journaled on a platen frame 48, which is mounted on the traveling typewriter carriage 49 (Figs. 1, 3 and 28). The carriage is constantly under the tension of a spring barrel 50, which tends to move the carriage in letter-feeding direction, said motion taking place at each depression of a key. The carriage is controlled in its step-by-step letter-feeding motion by the usual escapement wheel 51 connected to a pinion 52, meshing with a rack 53, pivotally mounted on the typewriter carriage 49. To permit the escapement wheel to turn, the dogs 54 and 55 are rocked at each depression of a key by a universal frame 56, which is moved rearwardly by a heel 57 on each type-bar, which strikes the universal frame each time a type prints on a work-sheet wound around the platen.

Jump movements of the carriage 49 may also be obtained in addition to the step-by-step movements, for the purpose of rapidly positioning the typewriter carriage in and at a computing zone. For this purpose the machine may be provided with the usual Underwood decimal-tabulating mechanism, which includes keys 58 (Fig. 3), mounted on the front ends of key levers (not shown herein), which are pivoted intermediate their ends, the rear end of each of which is connected to raise its plunger 60 into the path of one of a plurality of stops 61, mounted on a rack bar 62, said stops being adjustable at letter-space intervals along the rack bar, which forms part of the typewriter carriage 49. At the raising of any of the plungers 60, the rack bar 53 is disconnected from its pinion 52 by the usual carriage-release mechanism, not shown herein, thus releasing from the letter-feed escapement mechanism the carriage 49, which is rapidly drawn in letter-feed direction until arrested by one of the stops 61 thereon, striking against the raised plunger or counter stop 60.

The type-bars 44 for the keys 40 and 41 are each provided with two sets of types 45 and 46, so that they control selectively the writing of two different characters. On the numeral key type-bars the digit types 46 are usually placed to print in lower-case position, while other characters are printed by the upper-case types 45. To effect the change from writing normally lower-case characters to writing upper-case characters, the platen 47 is mounted to be shifted from a lower-case to an upper-case position. For this purpose there is provided a shift key 63 on a lever 64, (Figs. 1 and 28), the rear end of which engages a shift frame 65, pivoted on the framework of the typewriter, and provided with a horizontal rail 66, on which rests a roller 67, mounted on the platen frame 48. On depression of said shift key, the rail 66 is caused to move upwardly, thus raising the platen frame 48 to bring the printing line of the platen 47 opposite the upper-case types 45 on the type-bars 44, when the latter are swung to their printing position.

Figure 20:
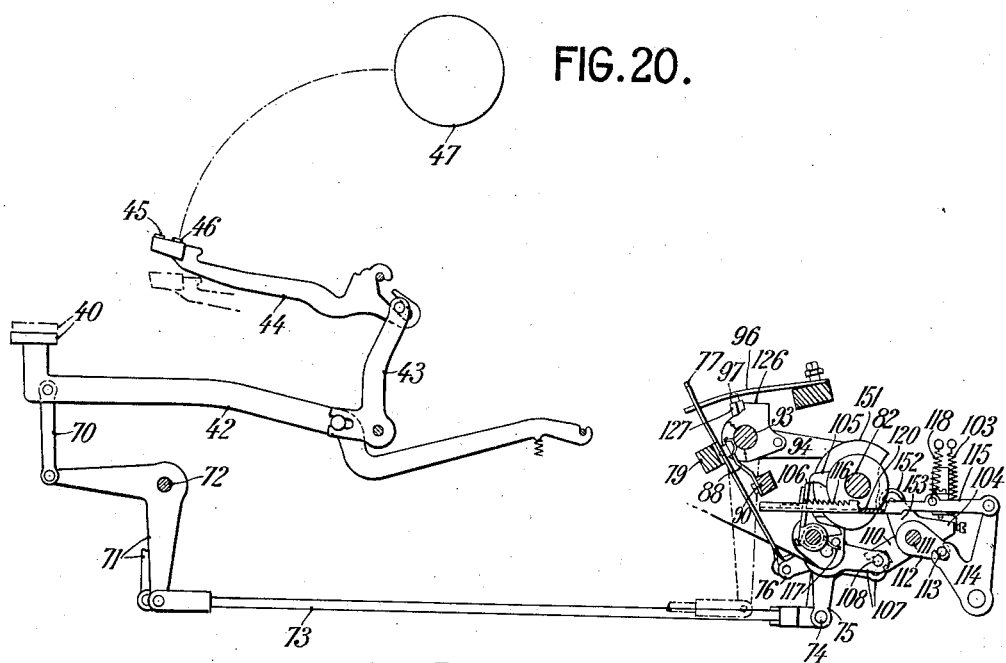
Fig. 20 is a diagrammatic side view of a numeral key and its connections to the indexing mechanism, showing the parts when the numeral key is partially depressed and the power shaft just about to be tripped.

For the purpose of indexing and computing the numbers printed upon the work-sheet, each numeral key lever 42, except the zero key lever, has pivoted thereto at its forward end a link 70 (Figs. 1, 3 and 4), which, when depressed at the actuation of a numeral key 40, swings a bell-crank 71 in counter-clockwise direction about a bar 72 (as shown in Figs. 1 and 20) common to all bell-cranks, to thrust rearwardly a horizontally-disposed link 73, the rear end of which is connected at 74 to a bell-crank 75 (Figs. 3, 9, 11 and 20). Said bell-crank is provided with a forwardly-extending arm 76, which is connected to the indexing mechanism by a cam slide or link 77, guided at its upper end in a slideway 78 (Figs. 7 and 9), formed in a universal bar 79, there being one slideway 78 for each link 77. It will be seen by reference to Figs. 9, 20 and 21 that at each depression of a numeral key 40, the link 77 associated therewith will be moved downwardly to move a roller 80 of an indexing element into juxtaposition with its associated valuating or indexing cam 81 rigidly mounted on a power shaft or cam shaft 82, adapted to move through one revolution at a time and stop subsequent to the juxtaposing of said roller 80, for the purpose of running into a totalizer 83 (Figs. 3 and 14), the digit thus indexed, as will hereinafter appear.

To move said rollers 80 into effective position, there is provided on each link 77 a cam slot 86, engaging a pin 87 (Figs. 9, 10, 11, 20 and 21) on the upper end of a pivoted member 88, the lower ends of each being pivoted at 89 to a universal fixed bar 90. Each arm 88 is provided at its upper end with a pair of extensions 91 on either side of the pin 87 and engaging the sides of a frame 92, loosely mounted on a variably movable element or rock shaft 93, and adapted to slide laterally thereon to move from the Fig. 8 to the Fig. 10 position at the depression of its corresponding numeral key 40, so that said roller 80 mounted on the rear end of an arm 94 of said frame may overlie its associated cam 81. In order to prevent the rollers 80 (Figs. 12 and 21) from excessively and unevenly wearing by sliding directly on the shaft 82 in their lateral movement, and to permit sufficient room therebetween, so that said cams 81 may be fastened on said shaft by means of substantial hubs, each arm 94 is provided with an extension 95, which normally rests on the shaft 82 and slides over said shaft at the actuation of a numeral key to permit said roller to move above said cam hubs. It will be noted that the prevention of excessive wear on said rollers 80 insures a full stroke of the parts connected thereto for the greater part of the life of the machine, and the prevention of flat surfaces on said rollers, as would be the case if said rollers slid on said shaft, and thereby insures against spasmodic changes in the velocity of the connected parts, thereby increasing the life of the machine.

In order that the digits thus indexed may be run into the totalizer 83 by motive power, the machine is provided with an electric motor 100 (Figs. 1, 3, 6, 7 and 17) connected by suitable gearing to a spring motor 101, which is also connected by suitable gearing, as will hereinafter be described, to rotate the shaft 82 one revolution at the depression of any numeral key, except the "0" key.

The spring motor 101 constantly tends to rotate the power shaft 82 in counter-clockwise direction, and the shaft is held at rest by an arm 105 fast on the driving shaft 82 and normally overlying an upstanding stop or trip pawl 106 (Figs. 3, 5, 8, 20 and 21), which holds the shaft 82 against rotation.

Figure 21:
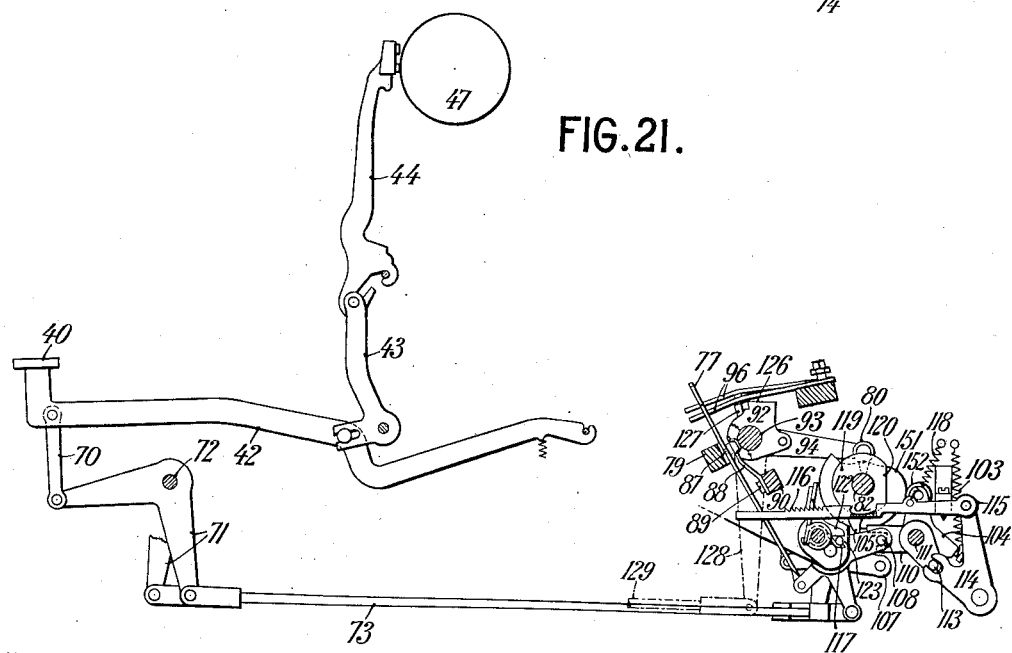
Fig. 21 is a view similar to Fig. 20, showing the parts when the numeral key is totally depressed by means of the power drive after it has become connected to said drive, as indicated in Fig. 20 position.

In order to swing said pawl 106 forwardly to release said driving shaft 82, each bell-crank 75 (Figs. 3, 5, 9, 11, 12, 20 and 21) has extending rearwardly therefrom a pair of parallel arms 107, carrying between their ends a wrist 108, which at the depression of a numeral key is moved into engagement with the upper reach 109 of a forked arm 110, mounted on a rock shaft or universal bar 111 to swing the latter in clockwise direction, as seen in Figs. 20 and 21, against the tension of a spring 103, one end of which is attached to an arm 104 fast on the rock shaft 111. Said universal bar 111 is provided with a forked arm 110 for each of the numeral keys from one to nine, and is also provided at its right end with an arm 112, having a pin-and-slot connection at 113 with a bell-crank 114, one arm of which has pivoted thereto a forwardly extending thrust link 115 (Figs. 5, 8, 20 and 21), which is adapted to be moved forwardly at the depression of a numeral key from the Fig. 20 to the Fig. 21 position. The thrust link 115 is provided at its forward end with ratchet teeth 116, which are urged into engagement with the detent pawl 106 by a spring 118, and are adapted to engage and swing said pawl against the tension of a coil spring 117 out of engagement with the arm 105, thus releasing the shaft 82, so that the latter may be rotated under the influence of the spring motor 101, and therewith all the cams 81, to raise the one roller 80 which has been moved into juxta-position with a cam 81.

To prevent any possible overthrow of the shaft 93 during a valuating operation when movement is transmitted to said shaft from the power shaft 82, there is provided for each numeral key an overthrow stud or pin 127, fast on the shaft 93, and each pin 127 is adapted to arrest the shaft 93 by striking a flat stopping plate 96 (Fig. 12), normally occupying a position indicated in said figure. During the initial movement of a numeral-key 40, the bell-crank 75 associated therewith becomes effective through the arm 76 to pull downwardly the slide 77, thus permitting the plate 96 to drop into coöperative relation with a reduced portion 97 (Fig 20) of the stud 127. It will be remembered that during the initial movement of the key 40, the motor is also tripped; after this takes place, the shaft 93 will be rocked through a distance proportional to the value of the numeral key actuated and the shaft will be arrested, or in other words an overthrow thereof will be prevented, by the reduced portion 97 of the pin 127 engaging in the forward end of a slot 98 (Fig. 9), formed in the stopping plate 96.

Since the shaft 93 is rotated through different angular distances, proportional to the value of the numeral key actuated, the slots 98 in the stopping plates 96 (Fig. 8) are made of different lengths.

As hereinbefore stated, each overthrow-preventing device or stopping plate 96 is normally out of engagement with its corresponding pin 127. The stopping plate is held in its normal position by the slide 77, which has a slot 99 at its upper end, the lower end of said slot normally engaging with a finger 102 on the stopping plate 96. As the slide 77 is moved downwardly, the stopping plate 96 follows the slide until the stopping plate is arrested by a shoulder on the pin 127 at the reduced portion 97. After the stopping plate 96 has been moved into effective relation with the pin 127, the slide 77 continues in its movement to bring the roller 80 into effective relation with its corresponding valuating cam 81. The latter movement is effected by means of the interponent 88, as hereinbefore described.

When the slide 77 reaches the end of its effective movement, the upper end of the slot 99 engages with the finger 102 of the stopping plate 96 to positively hold the latter in effective relation with the pin 127. It will be seen by an inspection of Fig. 11 that the cam slot 86, which engages with the pin 87 of the interponent 88, is formed with a dwell 125, by means of which the slide 77, while in its effective position, is also effective to positively hold the roller 80 in effective relation with the cam 81.

It should be understood that the universal bar 111 is actuated by a cam 151, fast on the one-revolution shaft 82, said cam engaging with a roller 152 on an arm 153 extending from the universal bar 111, and that said universal bar, after a release of the power shaft 82, is turned by said arm until it becomes effective by means of the bell-crank 75 to move the slide 77 to its effective position. Moreover the cam 151 is so shaped that the slide 77 is brought to its actuated position and held there before the valuating or indexing devices proper controlled from the power shaft 82 begin to turn the master wheel described below. Thus it will be understood that the stopping plate 96 and the roller 80 are positively held in their effective postions by the slide 77, the latter being positively held in its effective position during the indexing or valuating operation by a dwell on the cam 151.

The stopping plates 96 are held on a cross bar 154 (Figs. 8 and 12) by screws 155. Each stopping plate may be adjusted relatively to its pin 127 by an eccentric 157, which may be rotated about the screw 155 for the purpose of adjusting the plate 96, and then held in position by tightening the screw 155 after the proper adjustment has been made.

Each frame or interponent 92 (Figs. 8 and 12) may be adjusted relatively to the associated valuating cam 81 because the roller 80 is on a shouldered screw bolt 158, having an eccentric portion 159, engaging in a hole in the arm 94. It will thus be understood that the portion 159 is eccentrically positioned on the screw bolt 158, so that if the screw bolt is rotated, the head thereof engaging in the roller 80 will move eccentrically about the axis of the eccentric portion 159, thereby effecting an adjustment to or away from the valuating cam 81. Suitable nuts 160 are provided for locking the bolt to hold the roller 80 in its adjusted position.

To prevent the pawl 106 from being swung through an excessive angular distance and to prevent the ratchet teeth 116 from wearing against said pawl during the reciprocation of the thrust-link 115, there is provided on the shaft 82 a cam 119 (Figs. 3, 5, 8, 20 and 21), which has a flat surface 120 formed thereon (Fig. 21), normally in engagement with a shelf 121, as seen in Fig. 20, in which position said flat surface serves to limit the upward motion of said thrust-link against the tension of its spring 118, so that the teeth thereof are in engagement with the pawl 106. When the shaft 82 is released by the counter-clockwise swing of the pawl 106, the circular portion of the cam 119 engages the shelf 121 of the thrust-link to swing the latter downwardly against the tension of its spring, so that the teeth 116 will be moved out of engagement with the pawl 106 to permit the latter to be swung in clockwise direction by its spring 117 until an arm 122 formed on said pawl will be moved into engagement against a stop-pin 123, thereby limiting said clockwise swing of the pawl and holding said pawl in position to arrest the motion of the shaft 82. It will be seen by reference to Fig. 21 that when the circular portion of the cam 119 is in engagement with the shelf of the thrust-link 115, said link may be moved forwardly and rearwardly with the teeth 116 out of engagement with the pawl 106, thereby minimizing wear of the parts and lengthening the life of the machine.

In order to maintain the positional relation between the cam 119, the cam 151, which will hereinafter be further described, and the arm 105, said cams and arm are connected by a pin 124 (Figs. 5 and 8), passing through said cams and arm, all of which are fast on shaft 82. It will be seen that when the arm 105 strikes against the pawl 106, there is a tendency for said arm to be displaced relatively to said shaft, and that the bracing afforded by the pin 124 aids in holding the parts more rigidly together, thereby minimizing the tendency toward relative displacement.

For the purpose of actuating the register wheels in accord with the value of the digit thus indexed at the depression of the numeral key, each index member or interponent 92 (Figs 8 to 11, 12, 20, 21 and 25), is provided with a bail 126 in engagement with one of the pins 127 fast on the rock shaft 93. At the actuation of one of said interponents 92 by its associated valuating cam 81, the rock shaft 93 will be driven by the actuated pins 127 in counter-clockwise direction, as seen in Figs. 9, 20 and 21, an angular distance directly proportional to the value of the numeral key actuated. Said rock shaft 93 carries, near its right end, a depending arm 128, connected to a forwardly-extending link 129 (Figs. 3, 7, 25 and 27), the forward end of which is connected by a detachable pivot 130 to a bell crank 131, pivoted on the typewriter frame of the machine. During said counter-clockwise motion of the driven rock shaft 93, the bell crank 131 will also be rocked in counter-clockwise direction, through the intermediary of said arm 128 and link 129, to draw downwardly a link 133 connected at its lower end to said bell crank 131 and at its upper end to an arm 134 fast at one end of a rock shaft 138, journaled in the framework of the master-wheel mechanism. Said rock shaft carries at its other end an arm 139, to which is connected a thrust-link 135, (Figs. 5, 14, 25 and 27), pivoted at 136 to the forward end of a rack bar 137, to move said rack bar forwardly when said bell crank 131 is swung in counter-clockwise direction at the depression of a numeral key. It will be noted that the rack bar 137 is swung forwardly an amount directly proportional to the value of the cam 81, the corresponding numeral key of which has been depressed.

To limit the rearward motion of the rack bar 137 and to arrest it in a position, so that the forward teeth thereon are thereby directly opposite tooth spaces of the gear wheel 143, there is fast on the shaft 138 an arm 140 (Figs. 1 and 5) adapted to engage an adjustable stop 142 on the framework of the machine when said rack bar reaches its normal position.

It will be noted that the adjustable stop eliminates the necessity of accurately placing the teeth on the rack bar relatively to the usual Addendagraph pin-and-slot connections 170 and 173 described below if the latter are used to limit the rearward motion of said rack. It also eliminates the need of careful adjustment of the other parts connected to said rack bar and the parts interposed between it and the returning cam 190 (described below).

Figure 16:
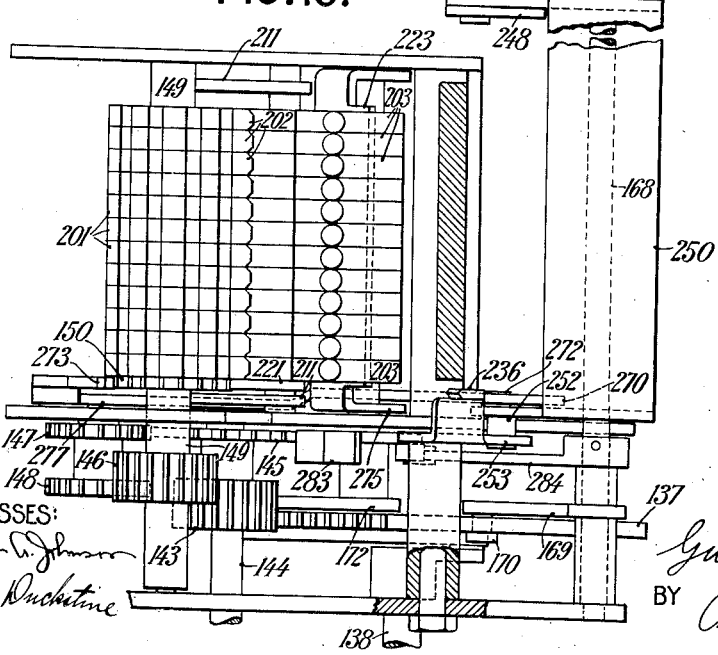
Fig. 16 is a top plan view of the actuator or parts shown in the lower portion of Fig. 14.

In order that the dial wheels 141 of the totalizer 83, (Figs. 14 and 16), may be rotated in accord with said forward motion of the rack bar 137, there is provided a gear wheel 143, with which the rack bar 137 is adapted to mesh during its forward stroke, said gear wheel being fast on a slidably mounted shaft 144, to which is also fast a gear wheel 145 of a change gear. The gear wheel 145 is adapted to drive a gear wheel 146 in one direction when meshing directly therewith, or to drive the latter in an opposite direction through the intermediary of gear wheels 147 and 148, the latter of which is constantly in mesh with said gear wheel 146, which is fast on a master wheel shaft 149, to which is also fast a master wheel 150 adapted to rotate amounts directly proportional to the amount of forward stroke imparted to said rack bar 137, the gearing interposed between said master wheel and said rack bar being proportional and arranged for this purpose. It will be noted that the change gear herein is illustrated and described in said application of Frederick A. Hart, Serial Number 70,898, filed January 8, 1916.

It will be noted in passing that when a numeral key 40 is depressed to the Fig. 20 position to trip the pawl 106, thereby releasing the shaft 82 to rotate, the fork 109 of the arm 110 associated with that key will engage its wrist 108, and through the intermediary of connected parts will complete the downstroke of said numeral key by the power of the motor. To do this, there is fast on the power shaft 82 (Figs. 3, 5, 8, 20 and 21) a cam 151, which, when rotated, engages a roller 152, mounted on an arm 153 fast on the rock shaft 111 which is rocked against the tension of the spring 103 in clockwise direction from the Fig. 1 to the Fig. 21 position, during which time the actuated numeral key will be forced to complete its downstroke through the intermediary of the bell crank 75, link 73, bell crank 71 and link 70, so that its associated type will print against the platen.

It will be noted by reference to Fig. 21 that when any numeral key is in depressed position, no other numeral key may be actuated to print against the platen until the depressed numeral key is returned to its normal position. For this purpose, the wrist 108 is adapted to strike against the underside of the arm 110 when said arm is in a raised position, thereby blocking the action of said subsequently actuated numeral key, which will be returned to its normal position by either the key lever spring 42$^a$ or the power of the spring 103, when said spring rocks the shaft 111 and arms 110 thereon to their normal position. It will also be noted that the numeral keys 40 may be actuated independently of the motor. This will happen when the computing mechanism is neutralized, or may happen when said keys are depressed at a greater speed than that at which said motor would drive them, the parts being so arranged that the roller 152 may be moved away from its cam 151 against the tension of the spring 103, when said roller is actuated by said key at a greater speed than the rotation of the cam 151 would impart thereto.

The totalizer 83 is provided with computing wheels 156, one for each denomination within its capacity, which are adapted to be brought into mesh seriatim with the master wheel 150 at each letter-space movement of the typewriter carriage, so as to transmit through said computing wheels 156 any rotation of the master wheel 150 to the dial wheels 141, each of which is directly and constantly in mesh with a computing wheel 156.

Figure 14:
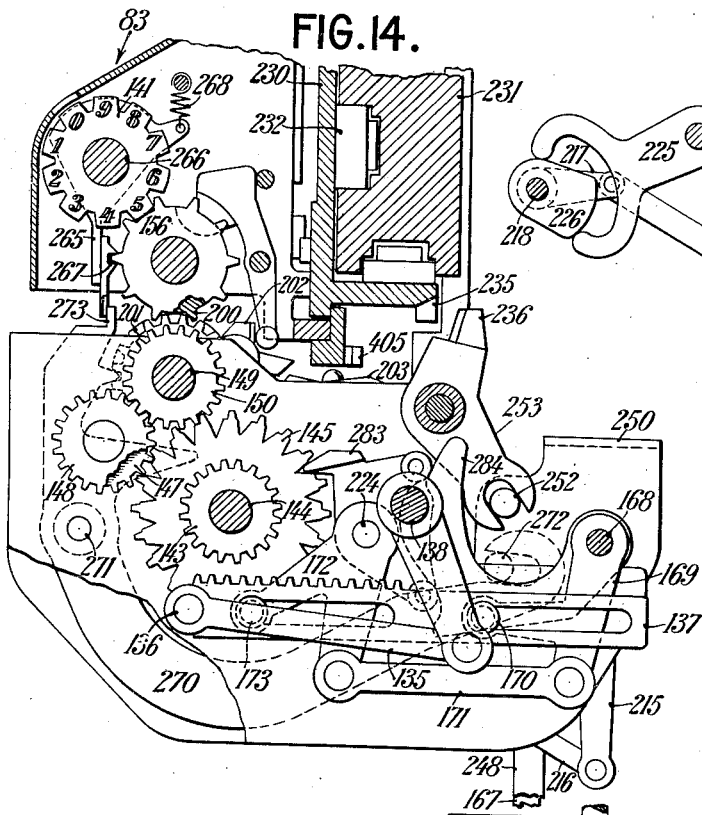
Fig. 14 is an enlarged sectional view through one of the totalizers and the actuator, showing the master wheel and parts associated therewith in normal position.

It will be seen, by reference to Figs. 3, 5, and 14, that the rack bar 137, when in its normal rearmost position, is out of mesh with its associated gear wheel 143. In order to transmit the motion imparted to said rack bar to the wheels in a totalizer, it is necessary to raise said rack into mesh with the gear wheel 143. For this purpose, there is provided on the power shaft 82 a cam 161, adapted to rotate therewith when said shaft is released (Figs. 5, 8, 13 and 22), and adapted to swing in clockwise direction a bell crank 162 when said cam actuates a roller 163 at the rear end of an extension 164 of said bell crank. To the depending arm of said bell crank 162 is connected a horizontally-disposed thrust-link 165 extending to the front of the machine, and adapted to be thrust forwardly at the actuation of said bell crank by the cam 161 to swing a bell crank 166 connected to said link 165, so that an upstanding link 167, connected to the bell crank 166 at the forward and left hand side of the machine will be thrust upwardly, to swing a rock shaft 168 (Fig. 5) in clockwise direction, and therewith an arm 215 to rock a shaft 218 by means of a link 216, connected to an arm 217 on the shaft 218. As the shaft 218 is rocked, a cam 226 thereon engages with a forked arm 225 secured to a rock shaft 224 to rock the latter in a clockwise direction. At the right-hand end of the shaft 224, there is secured a forked member or bell-crank 172, one arm of which has a pin-and-slot connection at 173 with the rack bar 137, and the other arm of which is connected to a rearwardly-extending link 171 connected to a forked member 169 loosely mounted on the rock shaft 168, one arm of the forked member 169 having a pin-and-slot connection 170 with the rack bar 137, the other arm being connected to the link 171. Thus, the rack 137 is raised into mesh with the pinion 143 by being moved parallel to itself by means of the members 169 and 172.

It is necessary to hold the forward end of the rack bar 137 fully in mesh with the gear 143 until the end of the forward stroke of said rack bar is completed in a computation, and it is advantageous to move said rack bar completely and rapidly out of mesh with said gear at the end of said computation and forward stroke of the rack bar. Therefore, it has been found desirable to lower the rack primarily at its forward end and provide suitable connections to cooperate at its rear end.

The connections are such that, at the end of the downward stroke of a numeral key, when the rack bar 137 reaches the end of its forward travel, and the cam 180 rocks the shaft 168, the arm 215 thereon will be swung rearwardly and therewith the link 216 and arm 217, to rock the shaft 218 and the cam 226 thereon, to rock the arm 225 and rock shaft 224, to rock the bell-crank 172 at the right end thereof, to depress the forward end of said rack bar, moving the teeth thereof completely and rapidly out of mesh with the gear 143.

It will be noted that, when the cam 226 is swung to the Fig. 23 position, the rack bar 137 will be positively held by its dwell in mesh with the gear wheel 143 against displacement due to the tendency of said gear and rack bar to move out of mesh with each other when power is applied to said rack bar in a driving action, the gear teeth of said rack bar and gear being so formed as to cause said tendency. The cam 226 and arm 225 also act to positively hold the cam against accidental displacement from its depressed position.

The cams 161 and 180 are so placed on the shaft 82 relatively to each other as to avoid blocking of the parts when said cams concomitantly actuate the rollers 163 and 181, respectively. It will be noted that said cams are so proportioned relatively to the distance between the rollers 163 and 181, that the bell crank 162 will be positively moved in either direction and will be held against displacement by the combined resistance of the cams 161 and 180 against their respective rollers and arms 164 and 182, when the latter tend to move radially toward the cam shaft 82. It will also be noted that the cam 180 is so proportioned and placed on the shaft 82 relatively to the valuating cams 81, that the rack bar 137 will not be moved out of mesh with its gear wheel 143 until the completion of the effective rotation of any one of said cams 81, after which the cam 180 becomes effective to swing the bell crank 162 in counter-clockwise direction.

It will also be noted that the cams 161 and 180 (Figs. 22 and 26) are provided with concentric portions 184 and 185, respectively, for the purpose of holding the rack bar 137 against actuation in a vertical direction during its forward and rearward stroke.

To return the rack bar 137 to its rearmost normal position after a forward computing movement thereof, there is fast on the shaft 82, near its right end, a cam 190 adapted to engage a roller 191 on an arm 192 (Figs. 5, 8, 12 and 27) fast on the indexing shaft 93. When the shaft 93 is swung in counter-clockwise direction by the cams 81 through the intermediary of the frame 92 to thrust the rack bar 137 forwardly, the roller 191 will be swung about the shaft 93 toward the shaft 82 from its normal Fig. 12 position. When said roller is thus swung, the cam 190 will occupy a position that will permit the roller 191 to be swung toward said shaft 82, the cam 190 being so formed as to continue to recede from said roller until the end of the extreme forward stroke of said rack bar 137, after which said cam 190 comes into engagement with the roller 191 to swing the arm 192 and shaft 93 in a clockwise direction, as seen in Fig. 27, and therewith the arm 128 to thrust forwardly the link 129 and through the bell crank 131, thrust upwardly the link 133 to swing the bell crank 134 in counter-clockwise direction, and through the connected parts 133, 134, 138, 139 and 135 retract the rack bar 137 to its rearmost normal position, where it is arrested by the arm 140 striking the stop 142, as hereinbefore described. It will also be noted that the cam 190 is so placed relatively to the cam 180 of the shaft 82, that the rack bar 137 will be drawn completely out of mesh with the gear wheel 143 by said cam 180 before the cam 190 becomes effective to retract said rack bar 137. It will be understood that the cam member 190 holds the shaft 93 against accidental displacement when in normal position.

In order that tens-carrying or tens-borrowing may be performed when any of the dial wheels 141 pass from "9" to "0," or vice versa, at the reading point, each computing wheel 156, except the one of highest denomination, is provided with a carry-over tooth 200 (Figs. 4 and 14), adapted to actuate tens-carrying wheels 201, (Figs. 4, 5, 14, 16, 18 and 19), loosely mounted on the master wheel shaft 149, to transmit a one point rotation at a time from wheels of lower to wheels of higher denomination in a carry-over action substantially as illustrated and described in an application of Henry L. Pitman, Serial Number 81,574, filed March 2, 1916.

In order to hold said carrying wheels 201 against accidental displacement and to aline said wheels at the completion of a carrying action, each carrying wheel 201 is provided with a detent or alining pawl 202 (Figs. 5, 16, 18 and 19), each detent being provided with a forwardly-extending arm 210 underlying a universal spring-pressed bail 211, (Figs. 5 and 18), constantly urged by a spring 205 to swing the detents 202 toward the carrying pinions 201, so as to engage between the teeth thereof to aline said carrying pinions and any computing and dial wheels which may be in mesh with them.

Figure 15:
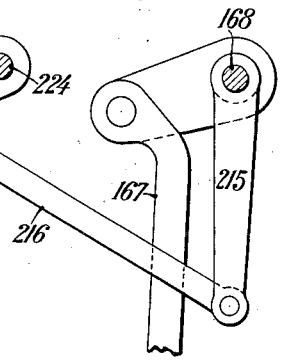
Fig. 15 is a detail side view of a portion of the mechanism to assist in raising and lowering the master wheel driving rack to its effective and ineffective positions, respectively.

It is advantageous, however, to aline said carry-over pinions 201 and the wheels in mesh therewith by the power of the motor 101. For this purpose, there is provided on the rock shaft 218, which is actuated by the power of said motor through the intermediary of connections and the cams 161 and 180 (Figs. 4, 5 and 15), a cam 219 adapted to engage depending arms 220 of the detents 202, and which is universal thereto. The cam 219 is normally in engagement with all of the arms 220 to hold the detents and carrying pinions 201 in alinement and against actuation. When, however, the rock shaft 168 is swung in said clockwise direction, as hereinbefore described, to raise the rack bar 137 into mesh with the gear wheel 143 prior to the actuation of the register wheels, the cam 219 swings out of engagement with all the arms 220, so that the alining pawls or detents 202 will be free to move against the spring pressure of the universal bail 211, when any of the carry-over wheels 201 is actuated by the carrying tooth 200.

At the end of the forward stroke of the rack bar 137, the rock shaft 168 will be swung in counter-clockwise direction by the cam 180, as hereinbefore described, to rock the shaft 224 in a counter-clockwise direction and depress said driver rack bar 137 out of mesh with its gear 143. Concomitantly the cam 219 is swung in clockwise direction through the intermediary of the parts 215, 216, 217 and 218 to engage *seriatim* the arms 220 of any of the displaced detents 202, from lower to higher denomination, to force said detents to their normal position and therewith any of the carry-over pinions 201 and any of the totalizer wheels in mesh therewith which may be out of alinement; the cam 219 being so formed that the right effective edge thereof will first engage the arm 220 at the extreme right and so on from right to left until the arm 220 at the extreme left is engaged.

It will be noted that the master wheel 150 is also held against accidental displacement and is alined by a detent 221 (Figs. 18 and 19), which has a forward extension 222 underlying said universal bail 211, and that said bail will be raised against the tension of its spring 205, when any of the carry-over wheels or the master wheel actuates its associated detent 202 or 221, respectively, thereby rendering said detents ineffective to control their respective wheels.

It will be seen from the foregoing that those of the carrying wheels 201 which at this time are not in mesh with any of the computing wheels 156, will not be controlled against accidental rotation by said detents. To hold against displacement the carrying wheels 201, not thus controlled, there is provided for each detent 202 a bell-crank 203, one arm of which is urged against the detent 202 by a spring-pressed plunger 204 (Figs. 5 and 18), but normally held out of engagement with said detents 202 by a universal member 223, journaled on the rock shaft 224. During the early part of the depression of a numeral key, as will presently be described, the universal member 223 is swung out of engagement with said bell-cranks 203, so that those of said bell-cranks which are not superposed by a cam member 207 fast on the totalizer 83 (Figs. 18, 22, and 23), will be moved by the spring plungers 204 into engagement with the detents 202 to hold the latter in engagement with their respective carrying wheels 201, so that said wheels will not be displaced during the actuation of the universal bail 211 in a computing action.

It will also be noted that by holding those of the bell-cranks 203 out of engagement with the detents 202, associated with those of the register wheels which may be engaged in a computing action, a lesser force will be required to rotate said wheels, and that wear on the parts will be reduced, thereby increasing the life of the machine. The universal member 223, when in its normal Fig. 18 position, also serves to avoid the contact between said cam member 207 and the bell-cranks 203, when the carriage 49 and totalizer 83 thereon are being moved back and forth laterally, thereby preventing wear of the parts.

The totalizer 83 is adjustably mounted on a bar or totalizer truck 230 (Figs. 1, 4 and 14), mounted on a rail 231 by means of rollers 232, said rail being rigidly held on the typewriter framework, and said bar attached to the typewriter carriage 49, so that the totalizer 83 will move laterally in unison with said carriage.

In order that the bar 230 and the totalizers thereon may be locked by the power of the motor against lateral motion during a computing action, for the purpose of alining the totalizer laterally relatively to the master wheel and carry-over wheels, said bar is provided with a comb 235 (Figs. 1, 5, 14, 18, 19 and 22), extending throughout its entire length, between the teeth of which is moved a detent or carriage lock 236 prior to the rotation of any of the register wheels. The detent 236 is normally out of the path of travel of the comb 235, as seen in Figs. 5, 14 and 18, and is moved into engagement with said comb (Fig. 19) at the early part of the depression of a numeral key. In order to do this, there is provided on the shaft 82 (Fig. 5) a cam 240 adapted, during its rotation, to swing in clockwise direction about a bar 243 a roller 241 in engagement with the cam, and mounted at one end of a forked arm 242 to swing forwardly an arm 244 attached to said forked arm 242, and thrust forwardly therewith a link 245. The forward end of said link is detachably connected at 247 to a bell-crank 246 which, in turn, is connected to an upstanding link 248, the upper end of which is connected to an arm 249 of a bail 250 extending toward the center of the machine, and journaled on the rock shaft 168. When the shaft 82 is released, as hereinbefore described, to rotate in counter-clockwise direction, motion will be transmitted from the motor 101 to said cam 240 and associated parts, to swing the bail 250 in clockwise direction and therewith an arm 251 thereon, which has a pin-and-slot connection at 252 with a lever 253 (Figs. 5, 14, 19 and 22), pivoted intermediate the ends of the framework of the master wheel mechanism, and carries at its upper end the detent 236, which will be swung forwardly from the Figs. 14 and 18 position to the Fig. 19 position into engagement with said comb 235, hereinbefore described. It will be noted that the detent 236 is beveled at 253ᵃ to facilitate the entrance thereof between the teeth of said comb.

In order to positively move the detent 236 out of engagement with the comb 235 to its normal position, there is provided on the shaft 82 a cam 260 (Figs. 5 and 13), adapted to actuate a roller 261 on the other end of a forked arm 242, to swing said arm in counter-clockwise direction during the latter part of the rotation of said shaft 82, and, through the intermediary of the same connections, swing the bail 250 in counter-clockwise direction about the shaft 168 to withdraw the detent 236 and release the typewriter carriage 49 and the totalizer 83 thereon, so that they may be moved in letter-feeding direction prior to the next computing action. Said cam 260 is so placed relatively to the cam 240 on the shaft 82 that it does not become effective on its roller 261 until the cam 240 has swung the forked arm 242 to the extreme end of its clockwise movement, and said cams are so proportioned as to positively hold the forked arm 242 and connected parts against random motion in either direction, thus positively holding the detent in or out of effective position. It will be noted that the cam 240 is so placed on the shaft 82 relatively to the valuating cams 81, that the detent 236 will be swung to effective position before any of the cams 81 engage their rollers 80 and before the wheels of the totalizer begin to rotate. It will also be noted that the cam 260 is so placed relatively to said valuating cams 81 that the detent 236 will be withdrawn from the comb 235 after the completion of the actuation of any roller 80 by its cam 81 and after the wheels of the totalizer have ceased to rotate.

The dial wheels 141, which mesh with the computing wheels 156, are normally held against actuation and in alinement by a universal bar 265 (Figs. 14, 18 and 19), which is loosely mounted on a dial wheel shaft 266, and has a groove 267 extending throughout its entire length to engage one tooth of each computing wheel 156, and is urged into engagement with said teeth by a spring 268.

In order that the computing wheels 156 and dial wheels 141 may be released by the power of the motor prior to a computing action, there is provided a lever 270, which is fulcrumed at 271 on the framework of the actuator or master wheel mechanism, and has a pin-and-slot connection at 272 with the arm 251 of the bail 250, whereby said lever is swung in counter-clockwise direction during the early part of the downstroke of a numeral key. Said lever 270 has an extension 273 at its upper end, adapted to engage the universal bar 265 to move the latter from the Figs. 14 and 18 position to the Fig. 19 position against the tension of the spring 268, to withdraw the groove 267 from engagement with the teeth of the computing wheels 156, thus releasing the latter to rotate during the computing action of the register-wheels. At the completion of the computing action of said wheels, the lever 270 will be moved in the opposite direction to permit the reëngagement of said universal bar 265 with the teeth of the computing wheels 156. It will be noted that one reciprocating movement of the extension 273 of the lever 270 takes place at every cycle of the cams 240 and 260, the cam 240 being effective to release the computing wheels, and the cam 260 being effective to lock said computing wheels.

In order to render some of the detents 202 effective to hold the carry-over wheels 201 against rotation during a computing action, as hereinbefore described, it is advantageous to actuate the universal member 223 simultaneously with the actuation of the lever 270. For this purpose the lever 270 is provided with a roller 274, mounted near its rear end, and is adapted to engage an arm 275, formed on the universal member 223, to hold said member in its normal Fig. 18 position against the pressure of the spring plungers 204, and to hold the bell-cranks 203 out of engagement with said detents 202. When the bail 250 is swung to the Fig. 19 position at the down-stroke of a numeral key, the lever 270 will be swung in counter-clockwise direction, as hereinbefore described, and therewith the universal member 223, from the Fig. 18 to the Figs. 22 and 23 position, thus leaving the bell-cranks 203 under the influence of the spring plungers 204, so that those of the bell-cranks 203, which stand in juxtaposition with the cam 207, will be swung into engagement with the cam 207 of the totalizer 83 (Fig. 23), and those of the bell-cranks 203, which are not in juxtaposition with said cam, will be swung into engagement with the associated detents 202, to hold the associated carry-over wheels 201 against accidental rotation. When the lever 270 is swung in clockwise direction, the universal member 223 will be moved to engage the bell-cranks 203 and swing the latter against the pressure of their spring plungers 204 to normal ineffective position, as seen in Fig. 18.

For the purpose of positively holding the master wheel 150 and the carrying pinions 201 against actuation at any time, when the master-wheel-actuating rack bar 137 is not in mesh with the pinion 143, the lever 270 is provided with extensions 276 and 277 (Figs. 5, 14, 18, 19 and 22), the former of which is adapted to engage a tooth-space of the master wheel 150, when the lever 270 is in its normal Fig. 18 position, which it assumes at the depression of the rack bar 137 subsequent to its forward computing motion. When said lever is in said normal position, said extension 277 overlies and engages the universal bail 211, which overlies the arms 210 of the detents 202, associated with the carrying pinions 201 and the arm 222 of the master-wheel detent 221, to positively hold said detents, and therethrough said pinions and master wheel against actuation.

It will be understood by an inspection of Figs. 18 and 19, that if the computing mechanism becomes stalled during a computing operation, thus leaving the master wheel in a fractional digit position, as shown in Fig. 19, the alining pawl 221, coöperating therewith, will be effective to lock the typewriter carriage against movement by means of the pawl 236, the alining pawl coöperating with the universal bar 211 to hold the lever 270, which coöperates with the bail 250 to hold it in the position indicated in Fig. 19. Since the pawl 236 is connected with the bail 250 at 252, the pawl will also be held in its actuated or retaining position.

If the mechanism should become stalled during a carry-over operation, the carriage will also be locked against movement, by the alining pawl 202, associated with the corresponding carry-over wheel, the alining pawl coöperating with the universal bar 211 to hold the retaining pawl 236 in its actuated position, as above described.

It should be understood that one advantage of locking the typewriter carriage against movement when the master wheel or one of the carry-over wheels occupies a fractional digit position, is to prevent the computing wheels 156 in the totalizer 83 from colliding with the teeth of the master wheel 150 or the carry-over wheels 201, to prevent the machine from becoming damaged, which would happen if the typewriter carriage became accidentally released.

The machine is adapted to perform addition and subtraction, and may be manually set to one state or the other by the depression of an adding key or a subtracting key 280 and 281, respectively, to shift the shaft 144, on which are fast the gears 143 and 145, (Figs. 1, 4, 5, 14 and 16), so that the latter may functionate in the manner hereinabove described.

In order that the gear 145 may be held against angular displacement during said shifting action, there is provided a detent 283, (Figs. 5, 14, 16, 22, 24, 25, 26 and 27), loosely mounted on the shaft 224, and positively held in effective position by a cam arm 284 fast on the rock shaft 168, said cam arm 284 being so formed as to hold said detent in engagement with said gear wheel 145, when the rack bar 137 is in its lowermost position, and to positively move the detent out of engagement with said gear wheel 145 when said rack bar 137 is raised into engagement with the gear wheel 143, and hold said detent out of engagement with said gear wheel during the forward motion of said rack bar, for which purpose the cams 161 and 180, fast on the power-shaft 82, are provided.

As hereinbefore described, the spring motor 101 is provided to drive the computing mechanism of the machine. In order that power may be stored in said spring motor, there is provided the electric motor 100 secured to a framework 290 comprising a bridge 290ª, (Figs. 1, 3, 6, 7 and 17), and connected by a conductor 291 with an electric-switch-terminal 292 of an electric-snap-switch, indicated in general at 293, (Fig. 17), which has another terminal 294 to which is attached a conductor 295 connected to an electric main 289 (Fig. 6) leading to a source of electric power, not shown herein. A conductor 296 is provided for conveying the current from said electric main directly to the motor 100, thereby closing the circuit through the motor when a switch bar 297 of said electric switch is in a position to contact with the switch-terminals 292 and 294.

When the circuit through the electric motor 100 is closed, the motor-shaft 298 (Figs. 6, 7 and 17), will be rotated in clockwise direction, as seen in Fig. 3, and therewith the shaft 299, through the intermediary of a coupling 300, to rotate an upright shaft 301, through the intermediary of spiral gear wheels 302 and 303 (Figs. 3, 6, 7 and 17). The shaft 301 is journaled in the framework 290, and is provided at its lower end with a worm 304 in mesh with a worm gear wheel 305, rotatably mounted on a transverse shaft 306 journaled in the framework 290, to rotate said gear wheel 305 in counter-clockwise direction, as seen in Figs. 1 and 3, to wind a motor spring 307, the right-hand end of which is connected to said worm gear wheel, and the other end of which is normally held against rotation. The attachment of said spring 307 to the gear wheel 305 includes a groove 308 (Fig. 17), into which is placed the righthand end of said spring, after which an annular ring 309 is slid over a hub 310 of the gear wheel 305, to close said groove, so that said spring will be securely attached to said gear wheel 305.

It will be noted that the diameter of the hub 310 and the inside diameter of the ring 309 are greater than the outside diameter of the spring 307, so that said ring may be slid over said spring in the operation of attaching the latter to said gear wheel.

It will be seen from the foregoing that the right-hand end of said spring will be rotated in counter-clockwise direction at the rotation of the motor-shaft 298, and in order that said rotation may wind said spring, the latter is held against rotation at its left-hand end (Fig. 17). For this purpose, there is fast on the shaft 306 a sleeve 311 having a groove 312 cut therein, into which is placed the left-hand end of said spring and held against displacement by a ring 313 fastened to said sleeve, to close the groove 312, thereby attaching the left-hand end of said spring to the shaft 306. During the rapid rotation of the motor-shaft 298, the shaft 306 is either stationary or moved through a small angular distance, which permits a greater angular rotation to be given to the right-hand end of the spring 307 than to the left-hand end thereof, thereby winding said spring and storing power therein. The shaft 306 is normally held against rotation by the pawl 106, through the intermediary of connections to be presently described.

Figure 12:
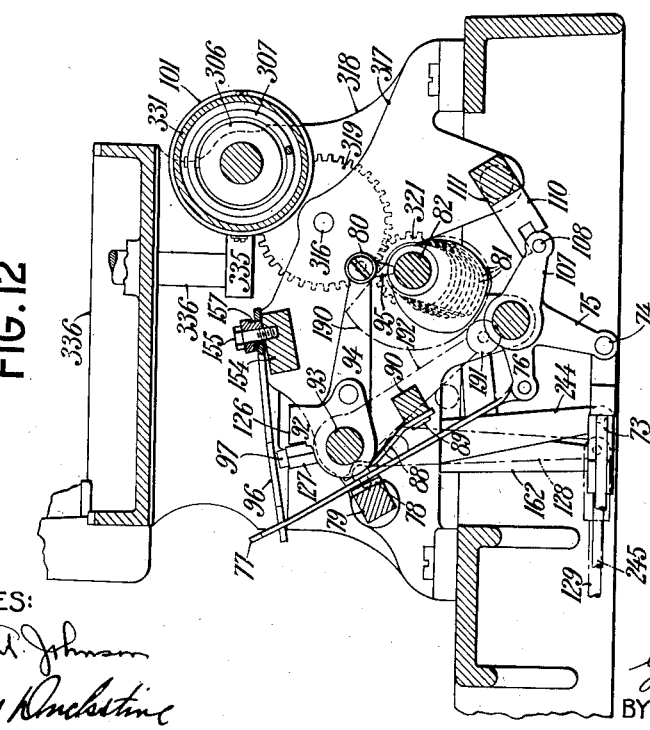
Fig. 12 is a skeleton side elevation, taken on the line 12—12 of Fig. 7, showing a portion of the driving mechanism, indexing mechanism and valuating cams, and the connection from the secondary or spring motor to the power shaft.

The spring 307 is coiled about the shaft 306, and constantly urges said shaft to rotate in counter-clockwise direction, as seen in Figs. 12, 13 and 17, and therewith a gear wheel 314 fast on said shaft and in mesh with a gear wheel 315 rotatably and loosely mounted on a shaft 316 journaled in the brackets 317 and 318 on the left-hand side and in the rear of the machine. On said shaft 316 is mounted a gear wheel 319 (Figs. 13 and 17), connected to the gear wheel 315 by a spring 320 to drive the gear wheel 319 in a clockwise direction therethrough, and to drive a gear wheel 321 in mesh therewith and fast near the left-hand end of the cam-bearing shaft or power-shaft 82, which is normally held against said driving by the pawl 106 (Fig. 3).

The driving mechanism of the machine is so constructed that the spring 307 will be wound after the greater portion of its stored power has been spent in the operation of the computing mechanism. For this purpose, the sleeve 311 is provided with a screw-threaded portion 325 (Fig. 17) meshing with a screw-thread 326 formed in a sleeve 327, slidably mounted on the shaft 306, and has longitudinal grooves 328 formed therein, into which extend pins 329 held in effective position by springs 330, and pass through holes formed in the left-hand end of a casing 331, the right-hand end of which is fastened to the hub 310 of the gear wheel 305, to rotate therewith. Said casing is fastened to said hub by means of a screw 332, which passes through the ring 309, and also serves to hold the latter against displacement. When the shaft 306 rotates in said counter-clockwise direction to drive the computing mechanism, the threaded portion 325 will be rotated therewith and relatively to the sleeve 327, since the latter is held against rotation through the intermediary of the pins 329, casing 331, screw 332 and gear wheel 305, which may at this time be at rest, since said gear wheel is in mesh with the worm 304 and cannot act to rotate said worm, but is only rotated thereby when the electric motor 100 is in action. This rotation of the threaded portion 325, relative to the sleeve 327, will cause said sleeve to move rightwardly along the shaft 306 to the Fig. 17 position, to actuate the switch 293 when most of the stored energy in the spring motor 101 has been exhausted, so that the connector 297 of the switch will engage the terminals 292 and 294, to close the circuit through the motor, for the purpose of winding the spring 307, as hereinbefore described.

In order that said rightward motion of the sleeve 327 may be effective to actuate said switch, the sleeve 327 is provided with an annular groove 333 in which engages a spherical roller 334 (Figs. 7 and 17), mounted at the rear end of an arm 335 fast to the lower end of an upright rock shaft 336, journaled in the framework 290. Said rock shaft carries at its upper end a forwardly-extending arm 337 (Figs. 6, 7 and 17), the front end of which has a flexible connection 324 with a rod 338 pivoted to a switch member 339 of the electric switch 293, said switch member being connected and actuated to move the connector 297 into and out of engagement with said terminals 292 and 294. It will be seen that when said sleeve 327 is moved rightwardly along the shaft 306 (Fig. 17), the bell crank 335, 337 will be swung in clockwise direction, to swing the switch member 339 in clockwise direction and therewith the connector 297 to the Fig. 17 position, at which time, the motor 100 may rotate the gear wheel 305 through the intermediary of its connection therewith to wind said spring 307.

For the purpose of breaking the circuit through the motor 100 at the completion of the winding of said spring 307, the casing 331 is rotated in unison with the gear wheel 305 to rotate the sleeve 327 relatively to the shaft 306 through the intermediary of the pins 329, and to move said sleeve leftwardly along the shaft 306, (Fig. 17) said leftward movement being due to the rotation of the thread 326 relative to the threaded portion 325, which at this time may be at rest. During the leftward movement of said sleeve 327, the bell crank 335, 337 will be swung in counter-clockwise direction to move the switch member 339 and connector 297 in counter-clockwise direction from the Fig. 17 position to break the circuit through the motor at said switch 293.

To prevent the strain of the parts of the switch 293, by the tendency of the moving parts of the driving mechanism to overthrow due to the rapid rotation of the motor shaft 298 during an energy-storing operation, there is provided a spring buffer 340 (Figs. 6, 7 and 17) held in position by a collar 341, which is adjustably mounted along the shaft 306 at the left of the sleeve 327, and so placed relatively thereto, that the left-hand face thereon will move into engagement with said spring 340 at the time that the circuit is broken at the switch 293, to check said sleeve against excessive leftward movement; and, through the intermediary of connected parts, prevent overthrow and strain of the switch parts. This spring buffer also prevents the threads 326 and 325 from becoming disengaged, and the grooves 328 and pins 329 from becoming disengaged, due to the over-rotation of the gear wheel 305 by the electric motor 100. Said spring buffer 340 also serves to prevent a breakdown of the parts of the mechanism, due to any failure of the operation of the electric switch 293 to stop the motor 100 by acting as a stop for the sleeve 327 to prevent over-rotation of the parts, even though the electric current may continue to pass through the motor. The spring buffer 340 further acts as a means for retarding the speed of the primary motor 100, through the train of mechanism connecting it with the secondary motor 101, after the circuit to the motor 100 has been opened. The parts of the electric switch 293 are protected against undue strain by the flexible connection 324 when the sleeve 327 is moved rightwardly along the shaft to close the circuit through said switch and motor. Said flexible connection 324 also aids to prevent undue strain of the switch parts and connections when said sleeve is moved leftwardly along said shaft 306.

It is advantageous that the motor 100 be easily removed from the framework 290 for repairs, adjustments or substitution, without removing the gearing therebetween and the spring motor 101, and thereby preserving the adjustments in said gearing. For this purpose, the shaft 299 (Figs. 1, 3, 6, 7 and 17), which is concentric with the electric motor shaft 298, is journaled in brackets 342 and 343 of the framework 290, and has fast at its left end a fork 344 of the coupling 300, and which engages a pin 345 formed on an arm 346, fast on the electric motor shaft 298. It will be seen that when the electric motor 100 is lifted off its base 290, the pin 345 will slide out of the fork 344 when the latter is in an upright position, and that said motor may be easily replaced.

It will be noted that the spring motor 101 drives the parts of the computing mechanism very rapidly, which will cause the arm 105, mounted on the power-shaft 82, to strike violently against the stop pawl 106 when the latter is in position to arrest the motion of said shaft and motor at the completion of a cycle. It is advantageous to reduce the violence of this blow and also to reduce the momentum of the other moving parts of the computing mechanism to lessen the tendency for overthrow of said parts and reduce the wear of said parts.

For this purpose, there is provided, at the extreme right end of the power-shaft 82, (Figs. 1, 5, 6, 7 and 8), a cam 350 in engagement with a pair of rollers 351 mounted on an arm 352, which is pivoted at 353 on a bracket 354, mounted on the base-plate 355 of the machine. The upper end of said arm 352 is pivotally and detachably connected at 356, Figs. 1, 5 and 7, to a plunger 357 slidably mounted in a cylinder 358 of a pneumatic check or dash-pot pivoted at 359 on the framework 290, having an air valve at 360, which permits atmospheric air to rapidly enter the cylinder 358 when said plunger 357 is drawn downwardly, and to check the rapid egress of air when said plunger is driven inwardly. The cam 350 is so placed on the shaft 82 as to hold said plunger 357 in its extreme inward position within the cylinder 358. It will be seen that when the shaft 82 is rotated from its normal Fig. 1 position, the plunger 357 will be drawn forwardly to fill the cylinder 358 with air during the initial part of the rotation of said shaft, and force said plunger inwardly during the latter part of the rotation of said shaft, at which time the air in said cylinder will become compressed and thereby retard the rapid rotation of the shaft 82, so that the speed of the arm 105 thereon will be reduced as it approaches the trip pawl 106, and also the force with which said arm will strike said pawl. It will also be seen that the reduction in the speed of the shaft 82 at the end of its cycle of rotation will also retard the speed of connected parts, thereby reducing the tendency of said parts to overthrow, and reducing the wear that the parts would otherwise be subjected to, thus prolonging the life of the machine.

To guide the forward end of the plunger 357, there is fast on the framework 290 a bracket 361 (Figs. 1, 5, 6 and 7), having an elongated hole 362 formed therein, which embraces the forward end of the stem of the plunger 357, and is so formed as to permit said plunger to reciprocate, and is elongated to permit said plunger to swing about the pivote 359 in unison with the cylinder 358.

It will also be noted that the spring 320 (Figs. 7, 8 and 17), interposed between the gearing which connects the shaft 82 and the spring motor 101, supplementarily aids the retarding mechanism or check 357, 358, since, by means of said spring 320, the parts of the spring motor 101 are permitted to rotate slightly after the shaft 82 has ceased rotating, when the arm 105 contacts with the pawl 106, thus preventing said spring motor from being stopped abruptly and reduces the force with which the arm 105 would otherwise strike the pawl 106, thereby reducing the strain of the parts of the driving mechanism and prolonging the life of the machine.

If, for any cause, the parts of the machine should become blocked, such as by the simultaneous depression of two numeral keys 40, for example, it is advantageous to restore the parts to the position which said parts occupied prior to said blocking. For this purpose, there is provided a handle 365 fast on a rock shaft 366 journaled in the base-plate 355 (Figs. 1, 2, 3 and 6), and having an arm 367 fast on the other end thereof, to which is connected a rearwardly-extending link 368, the rear end of which is connected to a segment 369 pivoted at 370 to the bracket 354. When the handle 365 is rocked forwardly from its Fig. 1 position, to draw the link 368 forwardly against the tension of its spring 371, the gear segment 369 will be swung in counter-clockwise direction (Figs. 1 and 2), to rotate a gear wheel 372 in mesh therewith and loosely mounted on the shaft 82, in clockwise direction and therewith a disk 373 fast to said gear wheel, on which is pivoted a pawl 374 (Fig. 2), the end of which is urged toward said shaft 82 by a spring 375 also mounted on said disk 373. The end of the pawl 374, in its rotation about the shaft 82, is adapted to engage a notch 376 formed on said shaft 82 to rotate said shaft with said pawl in clockwise direction against the power of the spring motor 101, to restore said shaft to normal position and therewith all the parts of the machine which have been actuated by said shaft prior to the blocking of the action thereof. It will be noted that, when the pawl 374 is in its normal Fig. 2 position and when the shaft 82 is in its normal position, the notch 376 is almost a complete revolution beyond the end of the pawl 374.

When the computing mechanism becomes blocked, the shaft 82 and notch 376 thereon may be arrested at any point in its rotation from its normal position, as in Fig. 2 for example. When the handle 365 is swung forwardly, the pawl 374 will be rotated idly about the shaft 82 until the end thereof engages the notch 376, from which point said pawl and shaft will be rotated in unison to the end of the stroke of said pawl, thereby returning said shaft to its normal position, during which movement the arm 105 thereon will have swung the pawl 106 forwardly against the tension of its spring 117, and will overlie said pawl so that said shaft will be held in its normal position, and permit the pawl 374 to be returned idly in counter-clockwise direction by the spring 371 to its normal position.

In order to prevent over-rotation of the pawl 374 and to hold said pawl in its normal position against the tension of the spring 371, it is advantageous to limit the motion of the segment 369. For this purpose, there is fast on the rock shaft 366 a collar 377 having a stop 378 formed thereon normally in engagement with a pin 379 fast on the base-plate 355 to limit the motion of the segment 369 in clockwise direction and to hold said pawl 374 in its normal position against the tension of the spring 371. Said collar 377 is also provided with a stop 380, which engages said pin 379 to limit the motion of the handle 365 when drawn forwardly and also the parts connected thereto. The stop 380 is so placed relatively to the stop 378 and relatively to the proportions of the gearing 369, 372, that the pawl 374 will be given almost a complete rotation at the forward stroke of said handle 365 from its normal Fig. 1 position to a position in which the stop 380 will engage the pin 379.

As hereinbefore described, after a depression of a numeral key 40, the key-lever 42 becomes connected to the universal bar 110 by the bell-crank 75 engaging therewith. Therefore, if for any reason the parts of the machine become blocked or stalled, the type-bar is held in an abnormal position, but it may be returned to its normal position together with the computing mechanism and the power-shaft by the key or finger-piece 365.

To permit the power-shaft 82 to rotate in counter-clockwise direction, that is, in computing direction, the pawl 374, when in a normal position, must be held out of engagement with the notch 376. For this purpose, the pawl 374 is provided with an extension 381 engaged by a pin 382 fast on the segment 369 (Fig. 2), when said pawl and segment are in their normal position to swing said pawl about its pivot against the tension of the spring 375, to raise the end thereof clear of the notch 376, the spring 371 being more powerful than the spring 375.

It is desirable at times to use the typewriting mechanism when not computing, as for example, when the numeral keys 40 are actuated to print digits not to be computed, such as dates, or page numbers, for example.

For this purpose, there is fulcrumed on the framework of the typewriter a lever 388 (Figs. 1, 3, 4 and 28) having a handle 389 at the upper end thereof, and having a pin-and-slot connection at the lower end thereof with a link 390, the rear end of which is connected to a bell-crank 391, also fulcrumed to the typewriter framework at 392 and drawn in clockwise direction by a spring 393. The depending arm of said bell-crank 391 is connected with a rearwardly-extending link 394, the rear end of which is connected to a depending arm of a bell-crank 395 journaled on the stub shaft 396 on which is also journaled the release pawl 106. When it is desired to neutralize the computing mechanism on the machine, the handle 389 is moved from the Fig. 4 position in which said handle is opposite the word "On," to a position in which said handle will be opposite the word "Off," thereby swinging said lever 388 in counter-clockwise direction (Figs. 1 and 3), to thrust rearwardly the link 390 to swing the bell-crank 391 against the tension of its spring 393, and thrust rearwardly the link 394 to swing the bell-crank 395, so that a pin 397 on the upstanding arm thereof will be swung downwardly to engage the forward end of the thrust rod 115 and swing the latter downwardly about its pivot on the bell-crank 114, so that the teeth 116 thereof will be moved out of engagement with the pawl 106 to a position similar to that shown in Fig. 21, relative to said pawl against the tension of the spring 118.

It will be seen that when the thrust arm 115 is thus swung downwardly, the forward motion imparted thereto at the actuation of the bell-crank 114, through its connections with any numeral key 40, will not be effective to swing the pawl 106 from the Fig. 20 position out of engagement with the arm 105, thereby permitting the shaft 82 and connected mechanism to remain at rest during the actuation of a numeral key.

To arrest the handle 389 at either end of its stroke, the lever 388 is provided with a pin 398 (Figs. 1, 3 and 4), normally in engagement with a stop 399 formed on the framework of the typewriter, and in engagement with a stop 400 when said handle 389 reaches its "off" position. The lever 388 is also provided with a detent (not shown herein), to hold the latter in its "on" and "off" positions, said detent being more powerful than the combined tension of the springs 393 and 118 when said handle is in "off" position.

It is advantageous to space the dial wheels 141 of the totalizer 83 (Figs. 4 and 28), so that an extra letter-space will exist between certain of the denominations of said totalizer, and so that the operative when computing may print the digits on the worksheet in accord with the arrangement of the dial wheels. It will be seen that when computation is being performed on any of the dial wheels 141 to the left of a blank space, at the sight-opening of the totalizer, the typewriter carriage and totalizer connected thereto must be moved more than one letter-space in letter-feeding direction to bring the dial wheel to the right of said blank space, that is, the dial wheel of the next lower denomination, to the computing point.

To avoid actuating the usual typewriter space-key to position the totalizer 83 when the arrangement of dial wheels is employed as herein-described, to pass said blank space over the computing point, and to avoid any malaction when a numeral key is depressed and when said space between the dial wheels of the totalizer is one space to the right of the computing point, mechanism is provided for the purpose of automatically causing the typewriter carriage and mechanism carried thereby to skip a space or move a plurality of letter-spaces in letter-feed direction at the end of a computing action in a denomination to the left of the dial wheel of which there is a blank space.

Said mechanism includes a series of cams 405 on the totalizer or traveling element (Figs. 1, 3, 4, 14, 18, 19, 22 and 28), adapted to engage a roller 406 mounted on the right-hand end of a transverse arm 407 of a bell-crank 408 fulcrumed at 409 on one side of the framework of the typewriter. When the denomination preceding a blank space 410 at the sight-opening of the totalizer comes to the computing point, the cam 405 swings the arm 407 rearwardly (Figs. 1, 4 and 28), to swing leftwardly a rearwardly-extending arm 411 and with it an arm 412 through a pin-and-slot connection 413, to swing an arm 414 forwardly, said arms 412 and 414 forming a horizontally disposed bell-crank fulcrumed at 415 on the framework of the typewriter. The arm 414 is provided with a rearward extension having stops 416 and 417 formed thereon (Figs. 28, 31, 32 and 33), the former of which normally lies in the path of the loose dog 55 of the typewriter escapement mechanism, hereinbefore-described, to produce single or step-by-step movements of the carriage.

When a type-key is actuated to print in normal feeding, the dogs 54 and 55 swing about their pivots from the Fig. 28 to the Figs. 29 and 31 position, so that said loose dog will become disengaged from a tooth 418 of the escapement wheel 51, and be drawn leftwardly by its spring 419 against the stop 416, so as to stand in engaging relation with the next tooth 420 of said escapement wheel, to arrest the latter at the completion of a single letter-space movement of the typewriter carriage 49.

If, however, one of said cams 405 is holding the bell-crank 408 at the depression of a type-key the stock 417 comes into engaging relation with the loose dog 55, as shown in Figs. 30 and 32, where the loose dog will be in a position to engage the next tooth but one 421 of said escapement wheel 51 to arrest the latter at the completion of a double letter-space or skipping movement of said typewriter carriage 49. This moves the dial-wheel 141 of next lower denomination, adjacent to said space 410, to the computing point, thereby enabling the omission of mechanism for locking the numeral keys when said space 410 is at the computing point, while at the same time preventing the writing of characters in the punctuation-space columns.

When it is desired to print a character on the work-sheet at any point along the writing line in which one of said blank spaces 410 is at the computing point, the handle 389 is moved to its "off" position, to swing the bell-crank 391 (Figs. 1, 4 and 28), in counter-clockwise direction, as hereinbefore described, thereby moving forwardly a link 422 connected to the upwardly-extending arm of the bell-crank 391, and guided by a pin 423 at the rear end thereof near which is fast, on said link, an inwardly-extending pin 424 carrying a roller 425. Said roller 425 is in engagement with a fork 426 (Figs. 1, 4 and 28,) formed on a lever of the first order 427, which is fulcrumed at 428 on the framework of the typewriter escapement mechanism.

At said forward motion of the link 422, the forked arm of said lever 427 is drawn forwardly to swing the other arm 429 thereof rearwardly, to move a stop 430 formed on a forward extension of said arm or stop member 429 into juxtaposition with the loose dog 55 of the typewriter escapement mechanism, so as to arrest said dog (Fig. 33), at the actuation of a type-key, at a point at which said dog will stand in engaging relation with said tooth 420 of the escapement wheel 51, regardless of the position of the stops 416 and 417, to arrest the typewriter carriage 49 at the end of a single letter-space movement at the completion of the actuation of said type-key. Thus, it will be seen that the double space-producing or skip-producing effect of the stop 417 is rendered ineffective.

As hereinbefore-described, the type-bars 44 are provided with upper and lower-case characters 45 and 46, respectively, the former being adapted to print against the platen when the platen has been moved to upper-case position by means of the shift-key 63. It is advantageous to place upon the type-bars, associated with the numeral keys 40, upper-case characters 45 (Fig. 28), other than digits, and to silence the computing mechanism and double-space-escapement mechanism when printing in upper-case position.

To silence the computing mechanism when the platen is shifted for writing in upper-case position, there is provided the pin 423, fast on the right-hand side of the shift-frame 65, which engages the forward end of the slot formed in the link 422 to move said link forwardly (Figs. 1, 4 and 28), to swing the bell-crank 391 in counter-clockwise direction (Fig. 3), against the tension of its spring 393 and therewith the bell-crank 395 through the intermediary of the connecting link 394, so that the pin 397 on said bell-crank will swing downwardly the arm 115 to move the teeth 116 thereof out of engagement with the trip-pawl 106, in which position said thrust-link or release 115 will be ineffective to trip the power-shaft 82 at the depression of a numeral key. It will be seen from the foregoing that when the platen is moved to upper-case position, no computation will be performed at the depression of any numeral key 40.

In order that the handle 389 may be left undisturbed in its "on" position when the computing mechanism is neutralized at the actuation of the shift-key, the link 390 is provided with a slot 433 (Figs. 1, 3 and 28), engaging a pin 434 on the lower end of the lever 388, thereby permitting said link 390 to move rearwardly relatively to the lever 388, while the latter remains stationary.

Simultaneously with the silencing of the computing mechanism at the actuation of the platen-shift frame 65, the lever 427, 429 (Fig. 28), is actuated through the intermediary of the pin 434 and roller 425, to move the stop 430 of said lever to effective position to arrest the loose dog 55 of the typewriter escapement mechanism, so that said dog will stand in engaging relation with the tooth 420 of the escapement wheel 51 at the actuation of a key, to arrest the carriage 49 at the end of a single letter-space movement.

It will be noted in passing that the pin-and-slot connection 423 (Fig. 28), is provided also for the purpose of enabling the operative to actuate the handle 389 from "on" to "off" position, without disturbing the shift-frame 65 and connected parts.

By an inspection of Figs. 1 and 28, it will be seen that the means for producing skipping movements of the typewriter carriage 49 and the traveling element or totalizer 83, comprises a substantially horizontally-disposed U-shaped train of connections including the two bell-cranks connected to each other at 413, and pivoted near the side of the machine frame at 409 and 415, respectively. This forms a simple train of connections from the front of the machine where the cams 405 engage with the roller 406, which is one end of the train of skip-producing mechanism, thence along the side and toward the back of the machine to evade the type-bars 44 and the type-bar segment 44ª, and extends along the back of the type-bar segment 44ª to a point near the middle of the machine where the stops 416 and 417 engage with the loose dog 55 of the escapement mechanism.

It will also be seen that the lever 429, which renders the double-space-producing effect of the stop 417 ineffective, extends from the escapement mechanism toward the opposite side of the machine, where it is connected through the fork 426 to the case-shift mechanism comprising the shift-frame 65 and to the link 422 controlled by the non-compute key lever 388. The train of mechanism for rendering this skip-producing mechanism ineffective is also arranged to evade the type-bars and type-bar segment, by extending from the non-compute key lever 388 or from the case-shift key 63 along the side to the back of the machine where the connection is made to the lever 427.

By an inspection of Figs. 1, 3 and 28, it will be seen that the lever 391 is controlled by the non-compute key 389 and the case-shift mechanism including the link 422, and that the lever has connected thereto the link 394 extending to the bell-crank 395 which renders the thrust-link or motor-trip 115 ineffective. This motor-drive is also rendered ineffective simultaneously with the skip-producing mechanism, by means of either the case-shift mechanism or the disconnect mechanism including the non-compute key 389. As the computing mechanism is under the control of the motor-drive, it is also rendered ineffective simultaneously with the motor-trip or releasing device 115 and the skip-producing mechanism.

For accessibility, ease of repair, adjustment and manufacture, it is advantageous to construct the machine so that portions of the mechanism may be removed while other portions thereof may remain on the machine undisturbed in their adjustment. For this purpose, there is provided the base-plate 355 which has the typewriter framework mounted at the forward end thereof and the brackets 318 and 354 secured at either side of the rear end thereof. Said brackets serve to support the power-shaft 82, the indexing mechanism, the restoring mechanism and adjacent parts, and are secured to said base-plate 355 by means of screws 436 (Fig. 7). Above the brackets 318 and 354, and supported thereby, is the framework 290 on which is mounted the driving mechanism. Said framework 290 with the mechanism supported thereby is located relatively to the brackets 318 and 354 by means of dowel-pins 436ª (Figs. 1 and 7), which also serve to hold said framework 290 against lateral displacement. To hold said framework against vertical displacement, there are fulcrumed on the brackets 318 and 354 at 437 upwardly-extending arms 438 (Figs. 1, 6, 7 and 8), the upper ends of which are urged inwardly by springs 439 placed within sockets formed in said brackets 318 and 354 (Fig. 7), and encircle pins 440 fast in the lower ends of said arms 438, thereby urging the upper ends of said arms inwardly about their fulcrums 437, so that holes 441 formed in the upper ends thereof will engage pins 442 placed on either side of said framework 290, said pins being tapered at their ends to facilitate the entrance thereof into said holes 441. To remove the driving mechanism from the machine, each of the arms 438 is provided with a finger-piece 443 (Figs. 1, 7 and 8), whereby said arms may be simultaneously moved outwardly against the action of their springs 439, at which time said framework 290 may be removed from the machine and the arm 352 disconnected from the plunger 357 of the dash-pot, said arm being flexible for the purpose.

It will be noted that when the framework 290 is lifted off the brackets 318 and 354, the gears 314 and 315 will be moved out of mesh with each other, thereby releasing the spring-motor 101 which is now free to rotate rapidly, to unwind its spring 307. Said rapid rotation is, however, checked by the buffer-spring 340 provided on the spring-motor-shaft 306, which, as hereinbefore-described, also serves to prevent the unmeshing of the threads 325 and 326 of said spring-motor. It will be noted that the unwinding of the motor previous to the removal of the framework 290 from the machine sets the switch 293 to close the circuit through the electric motor 100, so that power will be stored in the spring-motor 101 as soon as the electric current is turned on, subsequent to the placing of said framework on the machine. It is, however, optional, before removing the framework 290, to exhaust the spring-motor to a point just prior to its closing the switch 293, after which the framework may be lifted from the machine and the motor will remain at rest.

The typewriter may be removed from the base-plate 355 by disconnecting the parts at the detachable pivot 130 (Fig. 6), and also at other similarly constructed pivots shown in Fig. 6, after which the typewriter and a portion of the computing mechanism may be lifted from the base-plate.

Variations may be resorted to within the scope of the invention, and portions of the improvements may be used without others.

Having thus described my invention, I claim:

1. In a combined typewriting and computing machine, the combination with numeral keys and computing wheels, of a variably movable element, driving means, interponents on said element, one for each numeral key, each interponent being movable to an effective position by its numeral key, and a universal bar operated by said numeral keys to release said driving means, so that the latter can move said variably movable element by the effective interponent.

2. In a combined typewriting and computing machine, the combination with numeral keys and computing wheels, of a variably movable element for engaging said wheels to turn them, valuating devices, one for each numeral key, an interponent for each numeral key and under its control means whereby each key shifts its interponent to position for coöperating with one of the valuating devices, to permit a movement of said variably movable element proportional to the value of the actuated key, a motor-driven drive-shaft universal to said devices, and means, including a shaft universal to the interponents and adapted to be driven thereby, to drive said element.

3. In a combined typewriting and computing machine, the combination with numeral keys and computing wheels, of a driven element, a driving element, valuating cams on said driving element, one for each numeral key, interponents on said driven element, one for each valuating cam, and means for bringing the valuating cam and its corresponding interponent into coöperative relation by the depression of their corresponding numeral key, so that a movement can be transmitted from said driving element to said driven element, proportional to the value of the actuated key.

4. In a combined typewriting and computing machine, the combination with numeral keys and computing wheels, of a driven element, a driving element, valuating cams on said driving element, one for each numeral key, interponents on said driven element, one for each valuating cam, each interponent being movable lengthwise of said driven element to bring it into coöperative relation with its corresponding valuating cam, said movement being controlled by its corresponding numeral key, and means for releasing said driving element to effect a movement of said driven element, proportional to the value of the actuated key.

5. In a combined typewriting and computing machine, the combination with numeral keys and computing wheels, of a variably movable power shaft, valuating cams on said power shaft, one for each numeral key, interponents on said variably movable shaft, one for each valuating cam, each interponent being movable lengthwise of said variably movable shaft to bring it into coöperative relation with its corresponding valuating cam, each interponent being effective to move said variably movable shaft in one direction only, and an amount proportional to the value of its corresponding numeral key, and means for releasing said power shaft.

6. In a combined typewriting and computing machine, the combination with numeral keys and dial wheels, of a variably movable shaft, valuating cams, one for each numeral key, said valuating cams being effective to oscillate said shaft through different angular distances, a drive-shaft common to said cams, and a motor-drive for said drive-shaft under the control of said numeral keys.

7. In a combined typewriting and computing machine, the combination with numeral keys and a traveling totalizer comprising dial wheels, of a master wheel for turning said wheels, a variably movable shaft for turning the master wheel, normally ineffective means, including arms on said shaft, one arm for each key for variably limiting its turning, means including valuating cams, for turning the shaft, one cam for each numeral key, a motor-drive for said cams, a release for said motor-drive under the control of said numeral keys, and connections whereby each key makes said limiting means effective in connection with the corresponding shaft-arm.

8. In a combined typewriting and computing machine, the combination with numeral keys, of computing mechanism comprising a variably movable element, valuating cams for actuating said element, one for each numeral key, and a cam for restoring said variably movable element.

9. In a combined typewriting and computing machine, the combination with numeral keys, of computing mechanism comprising a driven shaft, a driving shaft, valuating cams on said driving shaft, for effecting variable movements of said driven shaft, and a cam on said driving shaft to restore said driven shaft to its normal position.

10. In a combined typewriting and computing machine, the combination with numeral keys, of computing mechanism comprising a variably movable driven element, a driving element, and valuating devices, said driven element being normally locked against actuation, and said driving element being effective to release, drive and restore said driven element.

11. In a combined typewriting and computing machine, the combination with numeral keys and computing wheels, of an oscillating element, valuating cams, one for each numeral key, interponents, one for each valuating cam, and means for moving said interponent laterally into coöperative relation with its corresponding valuating cam, so that said oscillating element may be moved an amount proportional to the value of the depressed key.

12. In a combined typewriting and computing machine, the combination with numeral keys and computing wheels, of a variably movable element, valuating devices, one of each numeral key, interponents associated with said variably movable element, one for each valuating device, each interponent being provided with means for moving it laterally into coöperative relation with its corresponding valuating device, previous to the actuation of said interponent by its corresponding valuating device, said moving means comprising a key-controlled element, and an intermediate element engaged by said key-controlled element, said intermediate element engaging with said interponent.

13. In a combined typewriting and computing machine, the combination with numeral keys and computing wheels, of a variably movable element, valuating devices, one for each numeral key, interponents associated with said variably movable element, one for each valuating device, each interponent being provided with means for moving it laterally into coöperative relation with its corresponding valuating device, said means comprising a key-controlled cam, and an intermediate element engaged by said cam, said intermediate element engaging with said interponent.

14. In a combined typewriting and computing machine, the combination with numeral keys and computing wheels, of a variably movable element, normally ineffective means for driving said element in accordance with the numeral key actuated, and devices for limiting the different movements of said element to prevent overthrow, one means and one device for each numeral key, each limiting device being normally ineffective and rendered effective by its corresponding numeral key, the limiting effect of each device being proportional to its corresponding numeral key.

15. In a combined typewriting and computing machine, the combination with computing wheels, of a variably movable element, valuating devices for actuating said element through different distances corresponding to the values of the corresponding numeral keys, and overthrow-preventing devices, one for each numeral key, and under the control thereof.

16. In a combined typewriting and computing machine, the combination with numeral keys and computing wheels, of a driving shaft, a driven shaft, valuating cams on said driving shaft for moving said driven shaft through different angular distances, and limiting devices normally ineffective, each limiting device being rendered effective by its corresponding numeral key.

17. In a combined typewriting and computing machine, the combination with numeral keys and computing wheels, of a driving shaft, a driven shaft, valuating cams on said driving shaft, interponents on said driven shaft, projections on said driven shaft, and overthrow-preventing devices, there being one valuating cam, one interponent, one projection and one overthrow-preventing device for each numeral key, effective to move and limit the movement of said driven shaft, through an angular distance proportional to the corresponding numeral key.

18. In a combined typewriting and computing machine, the combination with numeral keys and computing wheels, of a variably movable shaft, means for actuating said shaft, overthrow-preventing devices, one for each numeral key, and means for rendering one of said overthrow-preventing devices effective during the initial movement of a numeral key.

19. In a combined typewriting and computing machine, the combination with numeral keys and computing wheels, of a variably movable shaft, means for actuating said shaft, overthrow preventing devices, one for each numeral key, means for rendering one of said overthrow preventing devices effective by its corresponding numeral key, and means for positively retaining said overthrow preventing device in its effective position during the actuation of said variably movable shaft.

20. In a combined typewriting and computing machine, the combination with numeral keys and computing wheels, of a driving shaft, a driven shaft, interponents, valuating cams coöperating with said interponents to transmit movement from said driving shaft to said driven shaft, overthrow preventing devices, one for each interponent, and means for rendering said interponents and said overthrow preventing devices effective during the initial movements of said numeral keys.

21. In a combined typewriting and computing machine, the combination with numeral keys and computing wheels, of a driving shaft, a driven shaft, valuating cams, one for each numeral key, interponents, one for each valuating cam, overthrow preventing devices for said driven shaft, one associated with each numeral key, means associated with each numeral key for rendering the overthrow preventing device and the interponent associated with said numeral key effective during its initial movement, and means for positively retaining said overthrow preventing device and said interponent in their effective positions while said driven shaft is being actuated.

22. In a combined typewriting and computing machine, the combination with numeral keys and computing wheels, of a driving shaft, a driven shaft, interponents, valuating cams for said interponents, overthrow preventing devices for said driven shaft, there being one valuating cam, one interponent and one overthrow preventing device for each numeral key, and means for rendering said interponent and said overthrow preventing device effective, each interponent having a roller adjustably mounted thereon, said roller engaging with its corresponding valuating cam, and each overthrow preventing device being adjustable relatively to said driven shaft.

23. In a combined typewriting and computing machine, the combination with numeral keys and computing wheels, of a driving element, a driven element, valuating devices, interponents between said valuating devices and said driven element, and overthrow preventing devices, there being one valuating device, one interponent and one overthrow preventing device for each numeral key to transmit and limit a movement to said driven element, proportional to the value of said numeral keys.

24. In a combined typewriting and computing machine, the combination with numeral keys and computing wheels, of a driving element, a driven element, valuating devices, interponents between said valuating devices and said driven element, overthrow preventing devices, there being one valuating device, one interponent and one overthrow preventing device for each numeral key, a universal bar engaged by said numeral keys, and a release for said driving element, said release being actuated by said universal bar.

25. In a combined typewriting and computing machine, the combination with numeral keys and computing wheels, of a driven element, interponents on said driven element, one for each numeral key, driving means, means for shifting any one of said interponents to its effective position by its numeral key, overthrow preventing means under the control of said numeral key, and means for releasing said driving means under the control of said numeral keys.

26. In a combined typewriting and computing machine, the combination with numeral keys and computing wheels, of an oscillatory driven element, a rotative driving element adapted to rotate a single full revolution at the depression of any of said numeral keys, and means for transmitting uniform rotative movements of said driving element to variably oscillate said driven element.

27. In a combined typewriting and computing machine, the combination with numeral keys and computing wheels, of an oscillator comprising interponents, and a rotative driving element under the control of said numeral keys, said interponents being shiftable into effective engagement with said driving element to transmit variable movements to said oscillator.

28. In a combined typewriting and computing machine, the combination with numeral keys and computing wheels, of an oscillator, a rotative driving element under the control of said numeral keys, valuating devices, and means coöperating with said valuating devices for transferring a constant movement of said driving element to variably move said oscillator.

29. In a combined typewriting and computing machine, the combination with computing mechanism, of a power drive therefor, said power drive including a power shaft, a motor geared thereto, a trip pawl, a dog on said shaft under the control of said trip pawl, means for actuating said trip pawl to release said power shaft to render it under the control of said motor, to rotate the power shaft through a fixed distance, and a dash-pot for retarding the speed of said shaft as it approaches the end of its movement.

30. The combination with a power drive, of a power shaft, a trip pawl, a dog on said shaft under the control of said trip pawl, means for actuating said trip pawl to release said power shaft to render it under the control of said motor, to rotate the power shaft through a fixed distance, and means for retarding the speed of said shaft as it approaches the end of its movement to prevent the dog on said power shaft from abruptly striking said trip pawl, said retarding means comprising a cam on said power shaft coöperating with a pivoted lever, said lever being connected to a dash-pot.

31. The combination with a series of printing keys, each having a pivoted connecting element under its control, of a universal bar adapted to engage either connecting element, means whereby a partial depression of a key will bring its connecting element into engagement with said universal bar, said means comprising a pivoted lever connected to said key and to said connecting element, a power drive, and means under the control of said universal bar to effect a release of said power drive.

32. In a combined typewriting and computing machine, the combination of a series of numeral keys, each having a connecting element under its control, a universal bar adapted to engage either connecting element, a power drive, computing mechanism controlled from said power drive, overthrow preventing means for said computing mechanism, means whereby a partial depression of either key will render the overthrow preventing means effective and bring its connecting element into engagement with said universal bar, and means under the control of said universal bar to effect a release of said power drive.

33. In a combined typewriting and computing machine, the combination of a series of numeral keys each having a connecting element under its control, a universal bar adapted to engage either connecting element, a power shaft, computing mechanism comprising an oscillator, overthrow preventing devices for said oscillator, one device for each numeral key, means whereby a partial depression of one of said keys will bring its corresponding over-throw-preventing device into coöperative relation with said oscillator, and its connecting element into engagement with said universal bar, and means under the control of said universal bar to effect the release of said power shaft.

34. In a combined typewriting and computing machine, the combination of a series of numeral keys, each having a pivoted connecting-element under its control, a universal bar adapted to engage either connecting-element, a power shaft, valuating devices on said power shaft, an oscillator, interponents on said oscillator, overthrow-preventing devices for said oscillator, there being one valuating device, interponent and overthrow-preventing device for each numeral key, means whereby a partial depression of one of said numeral keys will render its overthrow-preventing device and interponent effective, and bring its connecting element into engagement with said universal bar, and means under the control of said universal bar to effect a release of said power shaft.

35. In a computing machine, the combination with a master wheel, of a pinion for driving it, a rack for variably driving the pinion and normally standing clear of the pinion, a detent for locking the pinion, connections whereby the detent engages the pinion when the rack is clear of the pinion, and releases the pinion when the rack engages the pinion, and means for moving the rack radially into and out of engagement with the pinion.

36. In a computing machine, the combination with numeral keys, and a master wheel, of a power-drive for turning the master wheel to an extent determined by the keys operated, a pinion through which the master wheel is so turned, a rack adapted to drive the pinion from said drive, said rack normally standing clear of the pinion, a detent for holding the pinion, means operated at the operation of any numeral key through said power-drive for moving the rack radially into and out of engagement with the pinion, and connections whereby the detent engages the pinion when the rack is clear of the pinion, and releases the pinion when the rack engages the pinion.

37. In a combined typewriting and computing machine, the combination with a series of computing wheels and a master wheel therefor, of a normally disconnected driver for said master wheel, a train of mechanism from said driver to said master wheel, said train of mechanism being normally locked, means for simultaneously connecting said driver and for releasing said train of mechanism, means for retaining said driver connected, means for actuating said driver, means for releasing said driver after a predetermined movement has been imparted thereto, and means for returning said driver after it has become disconnected.

38. In a combined typewriting and computing machine, the combination with a series of traveling computing wheels, of a master wheel, a normally disconnected driver for the master wheel, means for moving said driver to connected position, means for moving said driver to rotate the computing wheels one at a time through the master wheel, means for disconnecting said driver after it has been effective to rotate the master wheel, means for returning said driver after it has become disconnected, and a key-controlled power-drive for operating all said means.

39. In a combined typewriting and computing machine, the combination of a power-drive, computing mechanism including a driver, valuating mechanism on said power-drive, means controlled from said power-drive for rendering said driver effective, said driver being moved by said valuating mechanism, and means controlled from said power-drive for rendering said driver ineffective after a predetermined movement has been imparted thereto.

40. In a combined typewriting and computing machine, the combination of a power-drive, computing mechanism, said computing mechanism comprising a master wheel, computing wheels, carry-over wheels, a master wheel driver, a train of mechanism from said driver to said master wheel, said train of mechanism, carry-over wheels and master wheel being normally locked against accidental displacement, indexing mechanism associated with said power-drive, means for simultaneously releasing said master wheel, carry-over wheels and said train of mechanism between the driver and the master wheel, and for connecting said driver to said train of mechanism, said power-drive being effective to move said master wheel driver after it has been connected, and means for simultaneously locking said carry-over wheels, said master wheel and said train of mechanism after a predetermined movement has been imparted to said master wheel driver.

41. In a computing machine, the combination with a series of carry-over wheels and a master wheel, of a series of detents for the carry-over wheels, spring devices normally holding said detents effective, a drive for the master wheel, a controlling device for making said spring devices ineffective, and a connection from said drive to said controlling device, whereby the drive operates the controlling device to make the spring devices ineffective whenever the master wheel turns.

42. The combination with a traveling totalizer comprising a series of computing wheels, of intermediate wheels coöperating with said computing wheels, alining pawls coöperating with said intermediate wheels, normally ineffective spring-pressed pawls, a universal element coöperating with said alining pawls to normally lock them against movement, means for rendering said universal element ineffective to render said spring-pressed pawls effective so as to hold said alining pawls when said universal element is rendered ineffective, and means for rendering said spring-pressed pawls ineffective, one by one, by a traveling movement of said totalizer.

43. In a combined typewriting and computing machine, the combination with a traveling totalizer, of computing mechanism comprising a master wheel and carry-over wheels, each carry-over wheel and master wheel having an alining pawl normally locked against actuation, spring-pressed pawls for said alining pawls, a universal bar coöperating with said spring-pressed pawls, means for actuating said universal bar to render said pawls effective to engage with said alining pawls, said pawls being rendered effective at each key depression, and means for preventing some of said pawls from being rendered effective as the totalizer advances in its traveling movement over the master wheel and carry-over wheels.

44. The combination with computing mechanism comprising a series of wheels, of means for actuating said wheels, alining devices for said wheels, and a motor-drive, said alining devices being actuated by said motor-drive.

45. The combination with computing mechanism comprising a series of wheels, of means for actuating said wheels, alining devices for said wheels, a universal element for said alining devices, and a power-drive, said power-drive being effective to actuate said universal element.

46. In a combined typewriting and computing machine, the combination with numeral keys, and computing mechanism comprising a series of carry-over transfer wheels, of means for actuating said carry-over transfer wheels, alining pawls for said carry-over transfer wheels, a universal cam engaging with said pawls, a power-shaft, a cam on said power-shaft, a train of mechanism connecting said last-mentioned cam to said universal cam, and a trip for said power-shaft, said trip being under the control of said numeral keys.

47. In a computing machine, the combination with a series of computing wheels, a series of carry-over wheels and a master wheel, of a series of detents for the carry-over wheels, spring devices normally holding said detents effective, a drive for the master wheel, a controlling device for making said spring devices ineffective, a holding arm whereby each computing wheel holds the detent for the higher wheel effective unless carrying-over, and a connection from said drive to said controlling device, whereby the drive operates the controlling device to make the spring device ineffective whenever the master wheel turns.

48. In a combined typewriting and computing machine, the combination with a traveling totalizer comprising computing wheels, of a master wheel, a power-driven shaft, means actuated by said shaft for driving said master wheel, means for normally locking said master wheel against rotative movement, a lock for said traveling totalizer, and means separate from said master-wheel-driving means, whereby actuation of said power-driven shaft will release the master wheel and render the totalizer-lock effective before the master wheel is turned by said driving means.

49. In a combined typewriting and computing machine, the combination with a traveling totalizer, comprising computing wheels, of a master wheel, a driver for said master wheel and normally clear of it, means for normally locking said master wheel against rotative movement, a lock for said traveling totalizer, a member having said master-wheel lock and said totalizer lock connected thereto, means for actuating said member to release said master wheel and lock said totalizer, and a power-drive, said driver and member being under the control of said power-drive.

50. In a combined typewriting and computing machine, the combination with a power-driven shaft, of computing mechanism including a master wheel and a normally disconnected driver for variably turning the master wheel, mechanism, including devices on said shaft, for variably moving the driver, and means including a device on said shaft for connecting the driver to the master wheel before it is driven, and then disconnecting it and returning it to normal position.

51. In a computing machine, the combination with a master wheel, of means for variably turning it, including a shaft variably rockable to determine the degree of turning of said master wheel, a series of pins on said shaft, a one-revolution power-shaft, arms, individual to said pins, for rocking the first shaft by means of its pins, means whereby said power-shaft may variably actuate the first shaft by means of said arms, one at a time, and selective means for determining the arms to be actuated by said power-shaft.

52. In a computing machine, the combination with a master wheel, of a rockable shaft, means whereby movements of said shaft will effect proportional movements of said master wheel, a series of pins on said shaft, normally ineffective arms having openings adapted to engage said pins to variably limit the throw of the rockable shaft, a power-drive for rocking said shaft, and key-operated means for making the power-drive effective and for selectively causing the arms to become effective.

53. In a computing machine, the combination with a master wheel, of a rockable shaft, means whereby movements of said shaft will effect proportional movements of said master wheel, a series of pins on said shaft, normally ineffective arms having openings adapted to engage said pins to variably limit the throw of the rockable shaft, a power-driven shaft, means, including arms selectively actuable by the power-driven shaft, to drive the rockable shaft, and key-operated means for making the power-driven shaft effective and for selectively causing the first arms to become effective.

54. In a power-driven machine comprising a series of key-controlled type-bars which swing to a common printing point, the combination with a power-drive, of a universal bar under the control of said keys during the initial movement thereof, a release for said power-drive under the control of said universal bar, said universal bar being effective after a release of said power-drive to swing said type-bar corresponding to the actuated key to the printing point, and means for restoring all of the parts to normal position if the mechanism becomes stalled.

55. In a power-driven machine comprising a series of key-controlled type-bars which swing to a common printing point, the combination with a power-drive, of a universal bar under the control of said keys during the initial movement thereof, a release for said power-drive under the control of said universal bar, said universal bar being effective after a release of said power-drive to swing said type-bar corresponding to the actuated key to the printing point, a finger-piece, a gear-sector under the control of said finger-piece, a pinion meshing with said gear-sector, and a pawl connected to said pinion, said pawl engaging with said power-drive when parts are actuated by said finger-piece to reversibly rotate said power-drive and restore it to its original position.

56. In a power-driven machine comprising a series of key-controlled type-bars which swing to a common printing point, the combination with a power-drive comprising a power-shaft, of a universal bar under the control of said keys during the initial movement thereof, a release for said power-drive under the control of said universal bar, said universal bar being effective after a release of said power-drive to swing the type-bar corresponding to the actuated key to the printing point, a finger-piece, a gear-sector under the control of said finger-piece, a pinion meshing with said gear-sector, a pawl connected to said pinion, said pawl being normally held out of engagement with said power-shaft by said gear-sector so that said power-shaft may be rotated without coming into conflict with said pawl, and a spring for bringing about the engagement between said pawl and power-shaft during the initial movement of said gear-sector to restore the actuated mechanism to its normal position.

57. In a computing machine, the combination with a master wheel, of a rockable shaft, means whereby movements of said shaft will effect proportional movements of said master wheel, a drive-shaft, valuating cams fast to the drive-shaft, and means, including arms movable axially of said drive-shaft to selectively be driven by the cams, to rock the first shaft.

58. In a computing machine, the combination with keys and a wheel to be variably driven, of means, including a shaft adapted to be variably rocked, to drive the wheel, a series of abutments on said shaft, a second shaft, a cam on said second shaft for each abutment, and devices for connecting said second shaft to said abutments by said keys, to cause the first shaft to be variably rocked.

59. In a computing machine, the combination with a plurality of keys, of a rocking wrist connected to each key, a rocking bar normally free from said wrists, but adapted to be connected to any rocked wrist by depression of its key, a power-shaft for rocking said bar, and means normally holding said shaft and adapted to be released at the initial movement of said bar.

60. In a combined typewriting and computing machine, the combination with a plurality of typewriter keys, of a power-shaft normally urged to turn in one direction, a series of wrists, one for each key, a pivoted support for each of said wrists, means normally holding said shaft against rotation, an arm forming an extension of each of said supports, an operative connection between each arm and the corresponding key, a rock-shaft, devices on said rock-shaft to be engaged by said wrists, to enable actuation of said rock-shaft, means whereby actuation of said rock-shaft will render said holding means ineffective, and means whereby the power-shaft will drive the rock-shaft and thereby complete the depression of the key.

61. The combination with a traveling carriage, of an escapement mechanism controlling the traveling movements of said carriage, numeral type key actions arranged to print upper and lower-case characters, case-shift mechanism determining whether upper or lower-case characters are to be printed, means for varying the action of said escapement mechanism to vary the movement of said carriage when printing lower-case digits, and obstructing means for said escapement mechanism brought into play by said case-shift mechanism when writing upper-case characters to limit the traveling movement of said carriage to regular step-by-step movements.

62. The combination with type-actuating key-levers, of keys for actuating said key-levers, a universal bar, means for connecting said key-levers with said universal bar, a cam for actuating said universal bar, to restore said key-levers to normal position, and a finger piece connected to operate the cam.

63. The combination with type-actuating key-levers, of keys for actuating said key-levers, a universal bar, means for connecting said key-levers with said universal bar, a cam for actuating said universal bar, a pinion, a pawl connected to said pinion, said pawl being effective to rotate said cam, a gear-sector meshing with said pinion, and a finger-piece for moving said gear-sector to restore said key-levers to their normal positions.

64. In a combined typewriting and computing machine, the combination with a plurality of typewriter keys, of a power-shaft behind the typewriting mechanism, a series of pivoted wrists, one for each key, near said shaft, means normally holding said shaft, a lever extension of each wrist, a connection between each key and its lever, a universal rock shaft adapted to be engaged by any actuated wrist, and, when so engaged, adapted to release said power-shaft, means whereby the power-shaft drives the rock shaft to drive the depressed key, and extensions on said rock shaft adapted to prevent the depression of a second key until one first actuated has finished its stroke.

65. In a combined typewriting and computing machine, the combination of a series of numeral keys, each having a connecting element under its control, a universal bar adapted to engage either connecting element, a power-drive, computing mechanism controlled from said power-drive, over-throw-preventing means for said computing mechanism, means whereby a partial depression of either key will render the overthrow-preventing means effective and bring its connecting element into engagement with said universal bar, means under the control of said universal bar to effect a release of said power-drive, and means whereby the power-drive will complete the depression of any partly-depressed key.

66. In a combined typewriting and computing machine, the combination of numeral-keys, printing devices, computing mechanism, said printing devices and said computing mechanism being under the control of said numeral-keys, a power-shaft, a release for said power-shaft, said power-shaft being effective to drive said printing devices and said computing mechanism, said power-shaft having an engaging portion thereon, a pawl normally out of operative relation with said engaging portion, and a finger-piece connected to said pawl to cause it to rotate said power-shaft and restore it to its normal position.

67. In a combined typewriting and computing machine, the combination of a series of numeral keys, each having a connecting element under its control, a universal bar adapted to engage either connecting element, a power-shaft, computing mechanism comprising an oscillator, overthrow-preventing devices for said oscillator, one device for each numeral key, means whereby a partial depression of one of said keys will bring its corresponding overthrow-preventing device into coöperative relation with said oscillator, and its connecting element into engagement with said universal bar, means under the control of said universal bar to effect the release of said power-shaft, and means whereby the power-shaft will complete the depression of any partly-depressed key.

68. In a computing machine, the combination with a series of carry-over wheels and a master wheel, of a series of detents for the carry-over wheels, spring devices normally holding said detents effective, a drive for the master wheel, a controlling device for making said spring devices ineffective, a connection from said drive to said device, whereby the drive operates the controlling device to make the spring devices ineffective whenever the master wheel turns, and means operated by said drive, at the end of a turning of the master wheel, for moving said detents *seriatim* to aline the carry-over wheels.

69. In a computing machine, the combination with a series of carry-over wheels and a master wheel, of a power-drive, keys for determining how far said drive shall turn the master wheel, detents for the carry-over wheels, spring devices normally holding the detents effective, and a connection from the power-drive for holding said spring devices ineffective while the master wheel is turning.

70. In a computing machine, the combination with a series of computing wheels, a series of carry-over wheels and a master wheel, of a power-drive, keys for determining how far said drive shall turn the master wheel, detents for the carry-over wheels, springs normally holding the detents effective, a holding arm whereby each computing wheel holds the detent for the higher wheel effective unless carrying-over, and a connection from the power-drive for holding said springs ineffective while the master wheel is turning.

71. In a combined typewriting and computing machine, the combination with a carriage and a traveling totalizer comprising dial wheels and computing wheels, of a master wheel rotatable through one or more digit distances, a power-driven shaft for turning the master wheel, a carriage lock, a connection from the shaft for actuating said lock, and means controlled from said master wheel for controlling said carriage lock to prevent the traveling movement of said totalizer when said master wheel remains turned a fractional digit space.

72. The combination with a traveling element, of an escapement mechanism for controlling movements of said traveling element including fast and loose dogs, two separate obstructions for limiting the extent of movement of said loose dog, so as to limit the travel of said element, and separate operating means individual to said obstructions for controlling said escapement mechanism to produce regular step-by-step movements of said traveling element or skipping movements of said traveling element, according to conditions desired.

73. In a combined typewriting and computing machine, the combination with computing mechanism comprising a traveling element, of a motor drive for said computing mechanism, and means controlled from said motor drive for locking said traveling element against traveling movement in either direction during a computing operation.

74. In a combined typewriting and computing machine, the combination with computing mechanism comprising a traveling totalizer and a relatively-fixed master wheel, of a motor drive for said computing mechanism, and means for locking said totalizer against traveling movement in either direction during a computing operation, said locking means being controlled from said motor drive.

75. In a combined typewriting and computing machine, the combination with computing mechanism comprising a traveling totalizer and a relatively-fixed master wheel, of a motor drive for said computing mechanism, and means for locking said totalizer against traveling movement during a computing operation, said locking means being actuated and held in its actuated position by said motor drive during a computing operation.

76. In a combined typewriting and computing machine, the combination with computing mechanism comprising a traveling totalizer and a relatively-fixed master wheel, of a motor drive for said computing mechanism, means for normally locking said master wheel against rotative movement, and means normally ineffective for locking said totalizer against traveling movement during a computing operation, said master-wheel-locking means and said totalizer-locking means being controlled from said motor drive.

77. In a combined typewriting and computing machine, the combination with computing mechanism comprising computing wheels, of means including a universal bar for normally locking said computing wheels against rotation, a power-drive for said computing mechanism, and means controlled from the power-drive for rendering said universal bar ineffective during the initial part of a computing operation.

78. In a combined typewriting and computing machine, the combination with computing mechanism comprising computing wheels, of a universal bar, means controlled by said bar for normally locking said computing wheels against rotation, a master wheel, means for normally locking said master wheel against rotation, and a power-drive for the computing mechanism adapted to release said master wheel and said computing wheels during the initial part of a computing operation.

79. The combination with a power-drive, of a universal bar actuated thereby, type-bars, and means for connecting one of said type-bars to said universal bar to cause the type-bars to print, said universal bar being also effective to restore a type-bar actuated prior to the return of the connected type-bar.

80. The combination with a normally restrained power-drive, of a universal bar actuated thereby, type-bars, means for connecting one of said type-bars to said universal bar to cause the type-bars to print, said universal bar being also effective to restore a type-bar actuated prior to the return of the connected type-bar, and a release for said power-drive, said universal bar comprising a series of forks, each fork having a prong engaged to move said universal bar to actuate said release for said power-drive, the other prong being effective to drive said type-bar after the release of said power-drive, said last mentioned prong being also effective to prevent the second mentioned type-bar colliding with said first mentioned type-bar.

81. In a combined typewriting and computing machine, the combination with numeral keys and computing mechanism, of a primary motor, a secondary motor, said primary motor being effective to transfer and store energy in said secondary motor, a power-drive geared to said secondary motor, mechanism connecting said keys to said power-drive, a frame for said numeral keys and said computing mechanism, a second frame for said primary and secondary motors, and a third frame for said power-drive, the first two mentioned frames being detachably mounted on the third mentioned frame, said second mentioned frame being located behind the first mentioned frame and above the third frame.

82. The combination with a traveling element, of escapement mechanism for permitting step-by-step movements of said traveling element, and means for producing skipping movements of said traveling element, said means comprising two intermediate elements connected to each other, one of said intermediate elements engaging with said traveling element, the other engaging with said escapement mechanism.

83. In a combined typewriting and computing machine, the combination with a traveling totalizer having actuating devices thereon, of escapement mechanism for permitting step-by-step movements of said traveling totalizer, and means for producing skipping movements of said totalizer, said means comprising two horizontally-disposed bell-crank levers connected to each other, one of said levers having stops thereon engaging with said escapement mechanism, the other lever engaging with the actuating devices on said totalizer to shift said stops.

84. The combination with a traveling element, of an escapement mechanism for permitting step-by-step movements of said traveling element, and intermediate mechanism for producing skipping movements of said traveling element, said intermediate mechanism comprising two horizontally-disposed bell-crank levers pivoted at the side of the machine frame, each bell-crank lever having an arm projecting laterally toward the middle of the machine and arms projecting toward and connected to each other, one of the laterally projecting arms engaging with said traveling element, the other inwardly projecting arm engaging with the escapement mechanism.

85. In a typewriting machine, the combination with a traveling element, a platen and printing devices arranged in front of and beneath said platen, of a traveling element in front of said printing devices, escapement mechanism arranged behind said printing devices, and means for producing skipping movements of said traveling element, said skip-producing means comprising a substantially U-shaped train of mechanism from a point in front of said printing devices, where one end of said mechanism engages with said traveling element, around the side, to a point in back of said printing devices, where the other end of said mechanism engages with said escapement mechanism.

86. The combination with a traveling element, of means for producing skipping movements of said traveling element, said means including a substantially U-shaped train of mechanism, the two branches of said U-shaped train extending crosswise of the machine, the base of said U-shaped train extending along the side of the machine.

87. The combination with a traveling element and an escapement mechanism, including a loose dog, of a stop member engaging with said loose dog for permitting single or double space movements of said traveling element, said stop member being shiftable by means controlled from said traveling element, a second stop member, and means for shifting the latter into coöperative relation with said loose dog for rendering the double space producing effect of said first mentioned stop member ineffective.

88. The combination with a traveling element and an escapement mechanism including a loose dog, of a stop member engaging with said loose dog for permitting single or double-space movements of said traveling element, said stop member being under the control of said traveling element to effect double-space movements at predetermined positions in its travel, case-shift mechanism, and a second stop member, under the control of said case-shift mechanism, for rendering the double-space producing effect on said first-mentioned stop member ineffective.

89. In a combined typewriting and computing machine, the combination with a traveling element and an escapement mechanism, of means for producing skipping effects of said traveling element, said means including a train of mechanism extending along the front side and back of the machine from said traveling element to said escapement mechanism, and means for rendering the skip-producing mechanism ineffective, said last-mentioned means including a train of mechanism extending from the escapement mechanism along the back toward the opposite side of the machine, and along the last-mentioned side.

90. The combination with a traveling element, of escapement mechanism for permitting step-by-step movements of said traveling element, means for producing skipping movements of said traveling element, said means comprising two bell-crank levers connected to each other, one of said levers engaging with said traveling element, the other engaging with said escapement mechanism, and means for rendering said skip-producing means ineffective, said last-mentioned means comprising a lever of the first order engaging with said escapement mechanism.

91. In a combined typewriting and computing machine, the combination with a traveling element, of escapement mechanism for permitting step-by-step movements of said traveling element, means for producing skipping movements of said traveling element, said means comprising two bell-crank levers connected to each other, one of said levers engaging with said traveling element, the other engaging with said escapement mechanism, means for rendering said skip-producing means ineffective, said last-mentioned means comprising a lever of the first order engaging with said escapement mechanism, a non-compute key, case-shift mechanism, and means for actuating said lever of the first order by the non-compute key or the case-shift mechanism, to render said skip-producing means ineffective.

92. The combination with a traveling carriage and an escapement mechanism including a loose dog, of means for producing single or double-space movements of said traveling element, said means comprising a pivoted lever having stepped stops thereon, the loose dog of said escapement mechanism engaging with one of said stops to produce single-space movements of said traveling element, said single-space producing stop being shiftable out of coöperative relation with said loose dog while the double-space producing stop is being rendered effective, a second pivoted stop member, and means for bringing said second stop member into coöperative relation with said loose dog to produce single-space movements of said traveling element while the double-space producing stop is in its effective position.

93. The combination with a traveling element, of mechanism for producing skipping movements of said element, a power-drive, and means for simultaneously rendering said skip-producing mechanism and said power-drive ineffective.

94. The combination with a traveling element, of mechanism for producing skipping movements of said element, a power-drive, releasing means for said power-drive, and means for simultaneously rendering said skip-producing mechanism and said releasing means ineffective.

95. In a combined typewriting and computing machine, the combination with a traveling element, of mechanism for producing skipping movements of said element, a power-drive, computing mechanism, and means for rendering said computing mechanism and said skip-producing mechanism ineffective by rendering said power-drive ineffective.

96. In a combined typewriting and computing machine, the combination with a traveling element, printing keys and case-shift mechanism, of mechanism for producing skipping movements of said traveling element, computing mechanism, a power-drive, and means controlled by said case-shift mechanism for simultaneously rendering said skip-producing mechanism, said computing mechanism and said power-drive ineffective.

97. The combination with a traveling element, of means for producing skipping movements of said element, printing keys, a power-drive under the control of said printing keys, and means for simultaneously rendering said skip-producing means and said power-drive ineffective.

98. In a combined typewriting and computing machine, the combination with a traveling element, of mechanism for producing skipping movements of said traveling element, numeral keys, computing mechanism, a power-drive, releasing mechanism for said power-drive under the control of said numeral keys, and means for simultaneously rendering said skip-producing mechanism and said releasing mechanism ineffective.

99. In a combined typewriting and computing machine, the combination with a traveling element, of mechanism for producing skipping movements of said element, printing keys, case-shift mechanism, computing mechanism, a power-drive under the control of said printing keys, and means controlled by said case-shift mechanism for simultaneously rendering said skip-producing mechanism, said power-drive and said computing mechanism ineffective.

100. In a computing machine, the combination with a traveling carriage and an escapement mechanism including a loose dog, of a stop member adapted to be variably positioned to limit the throw of said loose dog to one or double throws, to vary the feed of the carriage, and a second stop member adapted to be made effective independently of the first stop member, to limit the throw of the dog to a single throw.

GUSTAVE O. DEGENER.

Witnesses:
F. W. AUST,
A. G. LERCHSINGER.